United States Patent
Al Hamouz

(10) Patent No.: US 10,844,156 B2
(45) Date of Patent: Nov. 24, 2020

(54) CROSS-LINKED POLYMERIC RESIN AND METHODS OF USE

(71) Applicant: King Fahd University of Petroleum and Minerals, Dhahran (SA)

(72) Inventor: Othman Charles Sadeq Al Hamouz, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 26 days.

(21) Appl. No.: 15/923,556

(22) Filed: Mar. 16, 2018

(65) Prior Publication Data
US 2019/0284323 A1 Sep. 19, 2019

(51) Int. Cl.
*C08G 4/00* (2006.01)
*C08J 3/24* (2006.01)
(Continued)

(52) U.S. Cl.
CPC .............. *C08G 4/00* (2013.01); *B01D 15/265* (2013.01); *B01J 20/267* (2013.01); *B01J 20/281* (2013.01);
(Continued)

(58) Field of Classification Search
None
See application file for complete search history.

(56) References Cited

U.S. PATENT DOCUMENTS

2003/0125479 A1* 7/2003 Kinsho .............. C08G 18/0866
525/403

FOREIGN PATENT DOCUMENTS

CN 101671606 B 2/2012
CN 104736222 B 9/2017
(Continued)

OTHER PUBLICATIONS

Selcuk Simsek, et al., Effective mercury removal using a new developed polymer containing 2-(2' thiazolylazo) p-cresol, Nov. 2016, vol. 15/11, p. 2347-2356, http://web.a.ebscohost.com/abstract.

*Primary Examiner* — Kara M Peo
(74) *Attorney, Agent, or Firm* — Oblon, McClelland, Maier & Neustadt, L.L.P.

(57) ABSTRACT

A method for producing a cross-linked polymeric resin, whereby (i) a phenol compound, or an oligomer or polymer thereof, (ii) a diol, or an oligomer or polymer thereof, (iii) an aldehyde, (iv) an acid, and (v) an organic solvent are mixed together to produce a reaction mixture, the reaction mixture is heated at 70-200° C. to produce a precipitate, and the precipitate is washed and dried to form the cross-linked polymeric resin, wherein the phenol compound is of formula I:

(Continued)

and wherein the diol is of formula II:

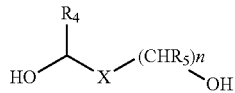

(II)

wherein $R_1$, $R_2$, $R_4$ and $R_5$ are independently H, an optionally substituted alkyl, an optionally substituted cycloalkyl, or an optionally substituted aryl; X is absent, HC=CH, or C≡C; and n=1, 2, 3, 4, 5, or 6.

8 Claims, 10 Drawing Sheets

(51) Int. Cl.
*B01J 20/26* (2006.01)
*B01J 20/28* (2006.01)
*B01J 20/281* (2006.01)
*B01D 15/26* (2006.01)
*C02F 1/28* (2006.01)
*B01J 20/30* (2006.01)
*C02F 101/20* (2006.01)

(52) U.S. Cl.
CPC ..... *B01J 20/28052* (2013.01); *B01J 20/3085* (2013.01); *C02F 1/285* (2013.01); *C08J 3/24* (2013.01); *G01N 30/482* (2013.01); *B01J 2220/54* (2013.01); *C02F 2101/20* (2013.01); *C08J 2361/00* (2013.01)

(56) References Cited

FOREIGN PATENT DOCUMENTS

| EP | 0000090 A1 | 11/1982 |
| IN | 201201045 P1 | 4/2015 |
| JP | 49013425 A | 2/1974 |

* cited by examiner

CROSS-LINKED POLYMERIC RESIN AND METHODS OF USE

STATEMENT REGARDING PRIOR DISCLOSURE BY THE INVENTORS

Aspects of this technology are described in an article "New Phenol-Glycol Cross-Linked Polymers for Efficient Removal of Mercury from Aqueous Solutions," Arabian Journal for Science and Engineering (2017). The article was published online Oct. 23, 2017.

BACKGROUND OF THE INVENTION

Technical Field

The present disclosure relates to cross-linked polymeric resins formed by the condensation of phenols, aldehydes, and diols, or oligomer or polymer thereof. Also, the present disclosure relates to applications of these cross-linked polymeric resins as agents for the removal of heavy metals, such as Hg(II) from aqueous solutions and compositions. In addition, the use of the resins in analytical methods to analyze a solution for the presence of toxic heavy metal ions is described.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Toxic metal ion contamination has raised serious concerns due to toxic effects on humans and the environment. Mercury, considered to be one of the most dangerous toxic metal ions is found in different forms that can accumulate in the living tissue of organisms causing different illnesses and disease such as brain and liver damage [Kim H H, Lee T G. "Removal of mercury ions in a simulated wastewater using functionalized poly(glycidyl methacrylate)" Journal of Industrial and Engineering Chemistry. 2017; 47:446-450; Bohli T, Villaescusa I, Ouederni A. "Comparative study of bivalent cationic metals adsorption Pb(II), Cd(II), Ni(II) and Cu(II) on olive stones chemically activated carbon" J Chem Eng Process Technol. 2013; 4(4):1000158/1000151-1000158/1000157; He Z-Y, Nie H-L, Branford-White C, Zhu L-M, Zhou Y-T, Zheng Y. "Removal of Cu2+ from aqueous solution by adsorption onto a novel activated nylon-based membrane" Bioresour. Technol. 2008; 99 (2014) 7954-7958; Atia A A, Donia A M, Yousif A M. "Removal of some hazardous heavy metals from aqueous solution using magnetic chelating resin with iminodiacetate functionality" Sep Purif Technol. 2008; 61, 348-357].

Mercury is produced from different industries such as metal smelting, electroplating, and is also produced and found in underground natural gas wells [Akintola O S, Saleh T A, Khaled M M, Al Hamouz O C S. "Removal of mercury (II) via a novel series of cross-linked polydithiocarbamates" Journal of the Taiwan Institute of Chemical Engineers. 2016; 60:602-616]. Due to the high risk and danger associated with mercury, it must be removed even at very low concentration. One of the most efficient and promising techniques for the removal of mercury is adsorption [Youssef A M, Malhat F M. "Selective Removal of Heavy Metals from Drinking Water Using Titanium Dioxide Nanowire". Macromol. Symp. (2014) 337 (1, Polymers and Materials):96-101; Jafari S A, Cheraghi S. "Mercury removal from aqueous solution by dried biomass of indigenous Vibrio parahaemolyticus PG02: Kinetic, equilibrium, and thermodynamic studies" International Biodeterioration & Biodegradation. 2014; 92(0), 12-19]. Different materials have been developed for the removal of mercury, such as polymers with specific functional groups, inorganic materials such as activated carbon, alumina and silica [Zewail T M, Yousef N S. Kinetic study of heavy metal ions removal by ion exchange in batch conical air spouted bed. Alexandria Engineering Journal. 2015; 54(1):83-90; Wang X, Deng W, Xie Y, Wang C. Selective removal of mercury ions using a chitosan-poly (vinyl alcohol) hydrogel adsorbent with three-dimensional network structure. Chemical Engineering Journal. 2013; 228:232-242; Mandavi S, Jalali M, Afkhami A. Heavy metals removal from aqueous solutions using $TiO_2$, MgO, and $Al_2O_3$ nanoparticles. Chem Eng Commun. 2013; 200, 448-470; Boudrahem F, Aissani-Benissad F, Soualah A. Kinetic and Equilibrium Study of the Sorption of Lead(II) Ions from Aqueous Phase by Activated Carbon. Arab J Sci Eng. 2013; 38(8):1939-1949].

In view of the forgoing, one object of the present disclosure is to provide cross-linked polymeric resins formed from the condensation reaction of a phenolic compound, an aldehyde compound, and a diol compound, or oligomers or polymers thereof. Another object of the present disclosure is to provide a process for producing the cross-linked polymeric resins by forming a reaction mixture comprising the phenolic compound, an aldehyde compound, an acid, and a diol, or oligomers or polymers thereof and heating. In addition to the cross-linked polymeric resins and methods for their preparation, the present disclosure further aims to provide methods for efficiently separating and removing heavy metals ions, specifically, Hg(II) ions, from an aqueous solution by employing the adsorbent properties of the cross-linked polymeric resins described herein.

BRIEF SUMMARY OF THE INVENTION

A first aspect of the invention is a method for producing a phenol-glycol cross-linked polymer comprising:

Mixing a phenolic compound or oligomer or polymer of the phenolic compound, a diol compound or an oligomer or a polymer of the diol compound, an aldehyde, an acid, and an organic solvent to produce a reaction mixture;

heating the reaction mixture at 60-200° C. to produce a precipitate; and washing and drying the precipitate to form the phenol-glycol cross-linked polymer, wherein the phenol is of formula I:

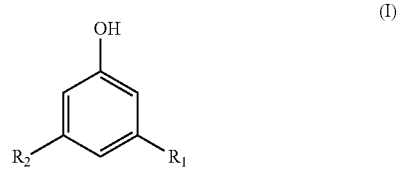

wherein $R_1$ and $R_2$ are independently H, $OR_3$, an optionally substituted alkyl, substituted cycloalkyl, or an optionally substituted aryl, and $R_3$ is H, optionally substituted alkyl, optional substituted cycloalkyl, or an optionally substituted aryl;

and the diol having formula II:

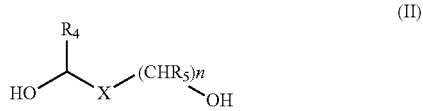

wherein R4 and R5 are independently H, optionally substituted alkyl, optional substituted cycloalkyl, or an optionally substituted aryl; x is absent, HC=CH, or C≡C, and n=1, 2, 3, 4, 5, or 6.

In a preferred embodiment of the method, the diol compound or oligomer thereof is selected from ethylene glycol (EG), diethylene glycol (DEG), triethylene glycol (TEG), polyethylene glycol (PEG), polypropylene glycol (PPG), and polybutylene glycol (PBG).

Another preferred embodiment the method, the solvent is at least one selected from the group consisting of n-pentane, cyclopentane, isopentane, hexane, cyclohexane, heptane, and octane.

Another preferred embodiment of the method, the reaction mixture is heated to 90 degree Celsius.

The most preferred embodiment of the method, the cross-linked resin formed from the reaction of compound (I) wherein $R_1$ and $R_2$=H, the diol compound is a glycol, or oligomer or polymer thereof, selected from the group consisting of ethylene glycol (EG) or oligomers thereof such as diethylene glycol (DEG), triethylene glycol (TEG) or tetraethylene glycol (TETG). The most preferred diol polymer is selected from the group consisting of polyethylene glycol (PEG), polypropylene glycol (PPG), and polybutylene glycol (PBG). The preferred aldehyde is selected from formaldehyde, acetaldehyde, propionaldehyde, and butyraldehyde. The most preferred aldehyde is formaldehyde. The reaction solvent can be any organic solvent such as n-pentane, cyclopentane, n-hexane, cyclohexane, heptane, and octane. The acid can be any mineral or organic acid such as concentrated hydrochloric acid, sulfuric acid, nitric acid, and acetic acid. The reaction mixture is heated at a temperature between 60-200 degree Celsius. The preferred heating temperature is 80 degree Celsius.

A preferred embodiment of the method, the diol or oligomer thereof is selected from ethylene glycol (EG), diethylene glycol (DEG), triethylene glycol (TEG), polyethylene glycol (PEG), polypropylene glycol (PPG), and polybutylene glycol (PBG).

Another preferred embodiment the method, the solvent is at least one selected from the group consisting of n-pentane, cyclopentane, isopentane, hexane, cyclohexane, heptane, and octane.

Another preferred embodiment of the method, the reaction mixture is heated to 90 degree Celsius.

The most preferred embodiment of the method, the cross-linked resin formed from the reaction of compound (I) wherein $R_1$ and $R_2$=H, the diol is a glycol, or oligomer or polymer thereof, selected from the group consisting of ethylene glycol (EG) or oligomers thereof such as diethylene glycol (DEG), triethylene glycol (TEG) or tetraethylene glycol (TETG). The most preferred diol polymer is selected from the group consisting of polyethylene glycol (PEG), polypropylene glycol (PPG), and polybutylene glycol (PBG). The preferred aldehyde is selected from formaldehyde, acetaldehyde, propionaldehyde, and butyraldehyde. The most preferred aldehyde is formaldehyde. The reaction solvent can be any organic solvent such as n-pentane, cyclopentane, n-hexane, cyclohexane, heptane, and octane. The acid can be any mineral or organic acid such as concentrated hydrochloric acid, sulfuric acid, nitric acid, and acetic acid. The reaction mixture heated is heated at a temperature between 60-200 degree Celsius. In the most preferred heating temperature is 80 degree Celsius.

According to a second aspect of the invention, the present disclosure relates to the polymeric resin product of the method described herein. In one embodiment, a cross-linked polymeric resin produced from the condensation reaction of a phenolic compound or oligomeric or polymeric phenolic compound, a diol, or an oligomer or a polymer thereof, and an aldehyde, where in the phenolic is of formula I:

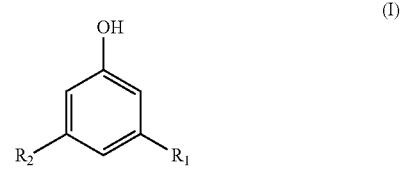

wherein $R_1$ and $R_2$ are independently H, $OR_3$, an optionally substituted alkyl, substituted cycloalkyl, or an optionally substituted aryl, and $R_3$ is H, optionally substituted alkyl, optional substituted cycloalkyl, or an optionally substituted aryl; and the diol having formula II:

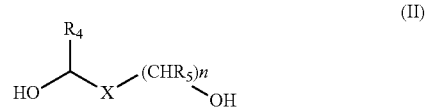

wherein R4 and R5 are independently H, optionally substituted alkyl, optional substituted cycloalkyl, or an optionally substituted aryl; x is absent, HC=CH, or, C≡C, and n=1, 2, 3, 4, 5, or 6.

In one embodiment, the cross-linked resin wherein $R_1$ and $R_2$ are H.

In another embodiment, x is absent in formula (II).

A preferred embodiment, the diol, or oligomer or polymer thereof is selected from ethylene glycol (EG), diethylene glycol (DEG), triethyleneglycol (TEG), tetraethylene glycol (TETG), polyethyleneglycol (PEG), polypropylene glycol (PPG), and polybutylene glycol (PBG).

Another preferred embodiment, the aldehyde is selected from the group consisting of formaldehyde, acetaldehyde, propionaldehyde, and butyraldehyde. The most preferred aldehyde is formaldehyde.

The most preferred embodiment, the cross-linked resin formed from the condensation reaction of unsubstituted phenol ($R_1$=$R_2$=H in formula I), TEGT, and formaldehyde.

A third aspect of the invention is a chromatographic column or cartridge packed with material comprising the cross-linked resin of the invention. In particular, the resin formed from the condensation reaction unsubstituted phenol ($R_1$=$R_2$=H), TEGT, and formaldehyde.

A fourth aspect of the invention is a method of removing toxic metal ion from a solution comprising:
  (a) mixing the cross-linked polymer of the invention with the solution containing the toxic metal ion, and
  (b) separating the metal ion bound polymer from the solution, and thereby removing the toxic metal ion from the solution.

A preferred embodiment, the method further comprises i) desorbing the heavy metal from the heavy metal loaded cross-linked polymeric resin by treating with an acid to reform the cross-linked polymeric resin and ii) reusing the cross-linked polymeric resin up to 15 times without a loss in adsorption capacity.

Another preferred embodiment, the heavy metal is at least one ion selected from the group consisting of Hg, Cu, Zn, Mn, Fe, and Ni. In the most preferred embodiment of the method, the heavy metal ion is Hg(II).

Another preferred embodiment, the cross-linked polymeric resin has an adsorption capacity in the range of 15-35 mg of heavy metal per gram of the cross-linked polymeric resin.

Another preferred embodiment, the aqueous solution of the method has a pH in the range of 3 to 10. the pH of the aqueous solution is 3.

A more preferred embodiment, the aqueous solution of the method has an initial heavy metal concentration in the range of 0.05 mmol $L^{-1}$ to 1.0 mmol $L^{-1}$.

A preferred embodiment of the method, the cross-linked polymeric resin is present at a concentration in the range of 0.02-5 g of resin per L of the aqueous solution during the contacting.

A preferred embodiment of the method, the cross-linked polymeric resin is contacted with the aqueous solution for 0.1 to 24 hours.

Another preferred embodiment of the method, the contacting is performed at a temperature in the range of 20° C. to 60° C.

The most preferred embodiment of the method, greater than 90% of the total mass of the heavy metal is removed.

The most preferred particular embodiment of the method, the metal ion is a divalent mercury ion and 1-2 g/L of the cross-liked is added wherein solution contains 5 mg/L of Hg (II) and 70% of the Hg (II) is adsorbed to the resin in 10 min. In another embodiment the solution is an aqueous solution having a pH of 3-10.

A fifth aspect of the invention is an analytical method for the separation and quantifying metal ions in a sample, said method comprising loading a column or cartridge with the cross-linked resin of the invention and eluting the column or cartridge with suitable solution.

A preferred embodiment of the method, the heavy metal is at least one ion selected from the group consisting of Hg, Cu, Zn, Mn, Fe, and Ni.

A more preferred embodiment, the heavy metal is Hg(II).

In one embodiment, the aqueous solution has a pH in the range of 3 to 10.

In another embodiment, the column or cartridge is kept at a constant temperature in the range of 20° C. to 60° C.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A illustrates thermogravimetric analysis of the synthesized phenol-glycol based cross-linked polymers. FIG. 3B illustrates a first derivative of the thermogravimetric analysis.

FIG. 8A illustrates the effect of initial concentration of $Hg^{2+}$ ions on the adsorption capacity, FIG. 8B shows a Langmuir isotherm model, FIG. 8C shows a Freundlich isotherm model.

FIG. 9A illustrates the effect of time on the adsorption capacity of mercury (II) ions by Ph-TETA, FIG. 9B shows a pseudo first-order kinetic model, and FIG. 9C shows a pseudo second-order kinetic model.

FIG. 10A illustrates the effect of increasing the temperature on the adsorption capacity of Ph-TETA, FIG. 10B is a Vant-Hoff plot.

DETAILED DESCRIPTION OF THE EMBODIMENTS

Figure 1:
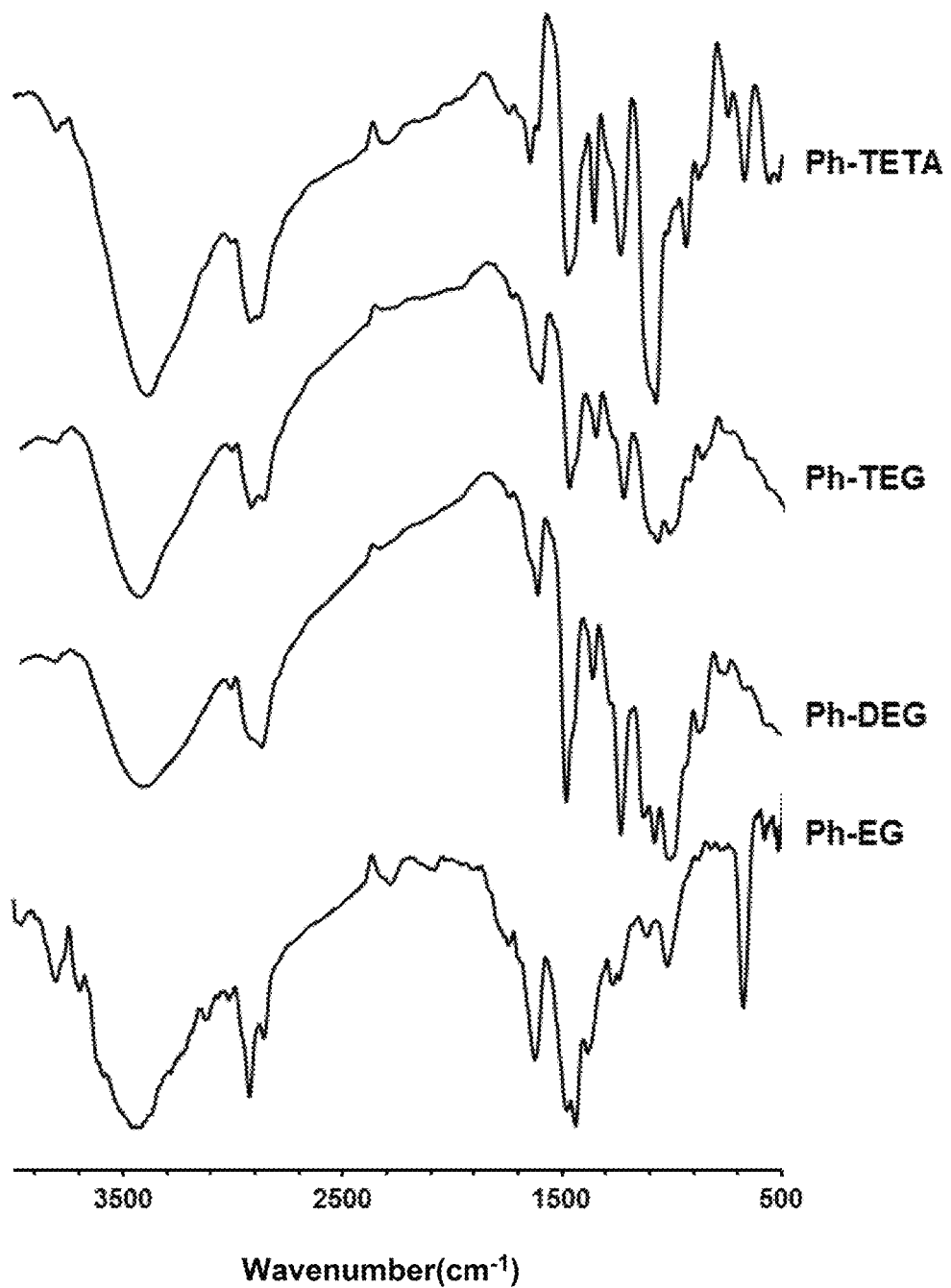
FIG. 1. FT-IR spectra for the synthesized phenol-glycol cross-linked polymers.

Referring now to the drawings. Embodiments of the present disclosure will now be described more fully hereinafter with reference to the accompanying drawings, in which some, but not all of the embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

As used herein a "polymer" or "polymeric resin" refers to a large molecule or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeating units together successively along the chain. The process by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portion crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst. In certain embodiments, at least one diaminoalkane or di-dithiocarbamate alkane functions as a cross-linking agent for the cross-linked polymeric resin described herein. In a preferred embodiment, the diaminoalkane or di-dithiocarbamate chains function as cross-linking agents or monomers can be add to the polymer or a polymerization reaction to modify to increase the cross-linking of the polymer.

As used herein, the terms "compound" and "complex" refer to a chemical entity, whether in the solid, liquid or gaseous phase, as well as in a crude mixture or purified and isolated form. The chemical transformations and/or reactions described herein are envisaged to proceed via standard laboratory and experimental techniques in regard to performing the reaction as well as standard purification, isolation and characterization protocols known to those of ordinary skill in the art.

As used herein, the term "salt" refers to derivatives of the disclosed compounds, monomers or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts of the present disclosure can be synthesized from the parent compound that contains a basic or acidic moiety by conventional chemical methods. Generally such salts can be prepared by reacting the free acid or base forms of these compounds with a stoichiometric amount of the appropriate base or acid in water or in an organic solvent, or in a mixture of the two; generally non-aqueous media like ether, ethyl acetate, ethanol, isopropanol, or acetonitrile are preferred.

As used herein, the term "solvate" refers to a physical association of a compound, monomer or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvates include, but are not limited to, hydrates ethanolates, methanolates, isopropanolates and mixtures thereof. Methods of solvation are generally known to those of ordinary skill in the art.

As used herein, the term "tautomer" refers to constitutional isomers of organic compounds that readily convert by the chemical reaction of tautomerization or tautomerism. The reaction commonly results in the formal migration of a hydrogen atom or proton, accompanied by a switch of a single bond and adjacent double bond. Tautomerism is a special cased of structural isomerism and because of the rapid interconversion; tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), enamine and enamine and anomers of reducing sugars.

Prototropy or prototropic tautomerism refers to the relocation of a proton. Prototropy may be considered a subset of acid base behavior. Prototropic tautomers are sets of isomeric protonation states with the same empirical formula and total charge. Tautomerizations may be catalyzed by bases (deprotonation, formation of an enolate or delocalized anion, and protonation at a different position of the anion) and/or acids (protonation, formation of a delocalized cation and deprotonation at a different position adjacent to the cation). Two additional subcategories of tautomerization include annular tautomerism, wherein a proton can occupy two or more positions of a heterocyclic system, and ring-chain tautomerism, wherein the movement of a proton is accompanied by a change from an open structure to a ring. Valence tautomerism is a type of tautomerism in which single and/or double bonds are rapidly formed and ruptured, without migration of atoms or groups. It is distinct from prototropic tautomerism, and involves processes with rapid reorganization of bonding electrons, such as open and closed forms of certain heterocycles, such as azide-tetrazole or mesoionic munchnone-acylamino ketene. Valence tautomerism requires a change in molecular geometry unlike canonical resonance structures or mesomers. In terms of the present disclosure, the tautomerism may refer to prototropic tautomerism, annular tautomerism, ring-chain tautomerism, valence tautomerism or mixtures thereof.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, an non-enantiomeric optical isomers. Diastereomers seldom have the same physical properties. In terms of the present disclosure, stereoisomers may refer to enantiomers, diastereomers or both.

Conformers (rotamers), or conformational isomerism refers to a form of isomerism that describes the phenomenon of molecules with the same structural formula but with different shapes due to rotations about one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation about the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valences are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

The instant invention is directed to a cross-linked resin formed by the condensation reaction of a phenolic compound, an aldehyde compound, and a diol compound, or oligomer or polymer thereof by heating the reaction mixture in an organic solvent in the presence of acid. Any substituted or unsubstituted phenolic compound or derivative thereof can be utilized in formation of the cross-linked resin. The only limitation on the phenolic compound is that, when a solution of said phenolic compound, an aldehyde, and a diol compound or oligomer or polymer thereof in the presence of acid is heated at a temperature between 60-200° C., a cross-linked resin is formed. Unsubstituted phenol such as phenol, alpha-naphthol, or beta-naphthol can be used. The phenolic compound can be a mono- or di-substituted phenolic compound, in particular, wherein the substituent is an electron donating group such as OH, OR, NH$_2$, NRR', SH, SR, or R, and wherein R' is a H or R, and R is independently an aryl or alkyl group having 1-6 carbon atoms, preferably, having 1-4 carbon atom such as methyl, ethyl, propyl, isopropyl, butyl, and isobutyl. Also, the phenolic compound can be oligomer or polymer of the phenolic compound mentioned above. In a preferred embodiment, the phenolic compound is selected from phenol, hydroquinone, catechol, resorcinol, and an alkylated derivative thereof at one or more of the phenolic oxygen atoms. In a more preferred embodiment, the phenolic compound is alkylated at the benzene ring, in particular, at the 3- and/or 5-positions with respect to the phenolic substitution, wherein the alkyl group can be methyl, ethyl, propyl or isopropyl. In particular, the alkyl substituents are at 3 and/or the 5 position of the aromatic ring. Examples of alkylated phenols include m-cresol and 3,5-dimethylphenol. In the most preferred embodiment, the phenolic compound is having formula (I), wherein R$_1$ and R$_2$ are independently H, OR$_3$, an optionally substituted alkyl, substituted cycloalkyl, or an optionally substituted aryl, and R$_3$ is H, optionally substituted alkyl, optional substituted cycloalkyl, or an optionally substituted aryl.

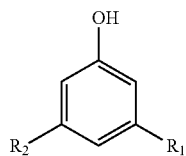

Similarly, any diol compound can be utilized as long as when heated in solution with a phenolic compound and an aldehyde in the presence of acid, the cross-linked resin is formed. In a preferred embodiment the diol is of formula II wherein $R_4$ and $R_5$ are independently H, optionally substituted alkyl, optional substituted cycloalkyl, or an optionally substituted aryl and X is absent, HC=CH, or C≡C, and n=1, 2, 3, 4, 5, or 6.

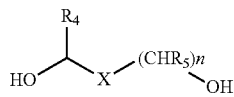

In a more preferred embodiment, the diol is a glycol or oligomer or polymer thereof. In a particular preferred embodiment, the glycol is ethylene glycol, propylene glycol, butylene glycol, and oligomer and polymers thereof such as diethylene glycol, triethylene glycol, tetraethylene glycol, polyethylene glycol, dipropylene glycol, tripropylene glycol, polypropylene glycol, tetrapropylene glycol, dibutylene glycol, tributylene glycol, and tetrabutylene glycol, and/or polybutylene glycol.

In a preferred embodiment, the aldehyde compound is a compound of formula (III)

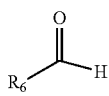

or tautomer or stereoisomer thereof, wherein $R_6$ is —H, an optionally substituted alkyl, an optionally substituted cycloalkyl, or an optionally substituted aryl, preferably $R_6$ is —H. In a preferred embodiment the compound of formula (III) is

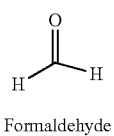

Formaldehyde

Without being bound by any structural limitation, an aspect of the invention is a cross-linked polymeric resin of formula (IV)

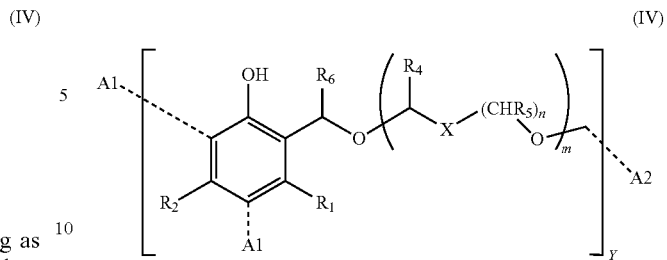

or a salt, solvate, tautomer or stereoisomer thereof wherein (a) $R_1$ and $R_2$ are independently H, $OR_3$, OH, amino, alkylamino, dialkylated amino, acylated amino, an optionally substituted alkyl, substituted cycloalkyl, or an optionally substituted aryl, and $R_3$ is H, optionally substituted alkyl, optional substituted cycloalkyl, an optionally substituted aryl; (b) $R_4$ and $R_5$ are independently H, optionally substituted alkyl, optional substituted cycloalkyl, or an optionally substituted aryl; (c) $R_6$ is methyl, ethyl, or propyl; (d) X is absent, HC=CH, or C≡C, and n=1, 2, 3, 4, 5, or 6; (e) m is a positive whole number in the range of 2-16; (f) Y is a positive whole number; and (g) $A_1$ forms a bond to $A_2$.

In a preferred embodiment, the cross-linked polymeric resin of the present disclosure is generally described as central phenolic units linked via the ortho, meta, para or mixtures thereof sites of the phenolic phenyl ring to another ortho, meta, para or mixtures thereof site of an additional phenolic unit through a diol, oligomer or polymer thereof with n representing repeating diol units of varying length through an aldehyde forming a $CHR_6$ linker. Formula (IV) may represent the smallest repeating unit of the cross-linked polymeric resin with $A_1$ forming a bond to an $A_2$ group of another phenolic core (ortho, para, or mixtures thereof) or central unit.

In a preferred embodiment, x is absent, n=1, and m is a positive whole number in the range of 2-16, preferably 3-14, preferably 4-12, preferably n is a positive whole number equal to 1, 2, 3, 4, 6, 8, 10, or 12. In a preferred embodiment, Y is a positive whole number; preferably Y is 1-10000, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50. In certain embodiments, the repeating unit Y may be repeated in the cross-linked polymeric resin of formula (IV) from 10 to 10000 times, preferably 20 to 5000 times, more preferably 25 to 2500 times, more preferably 50 to 1500 times, more preferably 100 to 1000 times. It is equally envisaged that values for Y may fall outside of these ranges and still provide suitable cross-linked polymeric resin of formula (IV) material.

In the most preferred embodiment, the preferred cross-linked polymeric resin has formula (V):

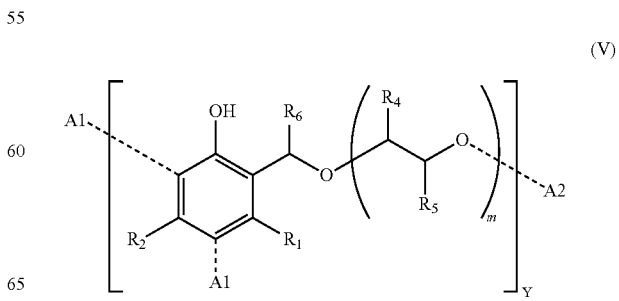

Wherein $R_1$ and $R_2$ are independently H, $OR_3$, OH, amino, alkylamino, dialkylated amino, acylated amino, an optionally substituted alkyl, substituted cycloalkyl, or an optionally substituted aryl, and $R_3$ is H, optionally substituted alkyl, optional substituted cycloalkyl, an optionally substituted aryl; (b) $R_4$ and $R_5$ are independently H, optionally substituted alkyl, optional substituted cycloalkyl, or an optionally substituted aryl; (c) $R_6$ is methyl, ethyl, or propyl; (d) m is a positive whole number in the range of 2-16; (f) Y is a positive whole number; and (e) $A_1$ forms a bond to $A_2$.

In certain embodiments, the cross-linked polymeric resin of the present disclosure may describe copolymers. Such copolymers may include, but are not limited to, copolymers of the cross-linked polymeric resin of formula (IV) and other polymeric materials, copolymers. Since a copolymer consists of at least two types of constituent units (structural units) copolymers can be classified based on how these units are arranged along the chain. Alternating copolymers are copolymers consisting of macromolecules comprising two species of monomeric units in a regular alternating sequence. An alternating copolymer may be considered as a homopolymer derived from an implicit or hypothetical monomer. A periodic copolymer is a copolymer which has two species of monomeric units arranged in a repeating sequence. A statistical copolymer is a copolymer in which the sequence of monomeric units follows a statistical rule. Alternatively if the probability of finding a specific monomeric unit at a particular point in the chain is equal to the mole fraction of that monomeric unit in the chain, then the polymer may be referred to as a truly random copolymer. In gradient copolymers the monomer composition changes gradually along the chain. The cross-linked polymeric resin of the present disclosure may refer to an alternating copolymer, a periodic copolymer, a statistical copolymer, a random copolymer or mixtures thereof.

Copolymers are also described in terms of the existence of or arrangement of branches in the polymer structure. Linear copolymers consist of a single main chain whereas branched copolymers consist of a single main chain with one or more polymeric side chains. The cross-linked polymeric resin of the present disclosure may refer to a linear copolymer, a branched copolymer, and other special types of branched copolymers including star copolymers, brush copolymer, comb copolymers and mixtures thereof.

A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or more distinct blocks are called diblock copolymers and triblock copolymers respectively, tetrablocks and multiblocks, etc. can also be fabricated. In stereoblock copolymers a special structure can be formed from one monomer where the distinguishing feature is the tacticity of each block. The cross-linked polymeric resin of the present disclosure may describe a block copolymer, a stereoblock copolymer or mixtures thereof.

A graft macromolecule refers to a macromolecule with one or more species of block connected to the main chain as side chains, these side chains having constitutional or configurational features that differ from those in the main chain. Graft copolymers are a specific type of branched copolymer in which the side chains are structurally distinct from the main chain. For example, the main chain and side chains may be composed of distinct homopolymers; however, the individual chains of a graft copolymer may be homopolymers or copolymers. Different copolymer sequencing is sufficient to define a structural difference, thus a diblock copolymer with alternating copolymer side chains may be termed a graft copolymer. As with block copolymers, the quasi-composite graft copolymer product has properties of both "components". The cross-linked polymeric resin of the present disclosure may refer to a graft copolymer.

Polymers can be classified based on their tacticity or structure. Tacticity may be defined as the geometric arrangement (orientation) of the characteristic group (side group or side chain) of monomer units or repeating units with respect to the main chain (backbone) of the polymer. An isotactic polymer is the type of polymer in which the characteristic groups are arranged on the same side of the main chain. A syndiotactic polymer is the type of polymer in which the characteristic groups are arranged in an alternating fashion. An atactic polymer is the type of polymer in which the characteristic groups are arranged in irregular fashion (randomness) around the main chain. The cross-linked polymeric resin of the present disclosure may be isotactic, syndiotactic, atactic or copolymers and mixtures thereof.

In general, polymeric mixtures are far less miscible than mixtures of small molecules. This is a result of the driving force for mixing usually being entropy, rather than interaction energy. Miscible materials generally form a solution not because their interaction with each other is more favorable than their self-interaction, but because of an increase in entropy and hence free energy associated with increasing the amount of volume available to each component. This tends to increase the free energy of mixing for much larger polymeric molecules in polymer solutions and thus makes solvation less favorable. In dilute solution, the properties of the polymer are characterized by the interaction between the solvent and the polymer. In a good solvent, the polymer appears swollen and occupies a large volume, the intermolecular forces between the solvent and monomer subunits dominate over intramolecular interactions. In a bad solvent or poor solvent, intramolecular forces dominate and the chain contracts.

Cross-linking is often measured by swelling experiments. The cross-linked sample is placed into a good solvent at a specific temperature, and either the change in mass or the change in volume is measured. The more cross-linking, the less swelling is attainable. Based on the degree of swelling, the Flory interaction parameter (which relates the solvent interaction with the sample), and the density of the solvent, the theoretical degree of cross-linking can be calculated according to Flory's network theory. Two ASTM standards are commonly used to describe the degree of cross-linking in polymeric resins. In ASTM D2765, the samples is weighted, and then placed in a solvent for 24 hours, weight again while swollen, then dried and weighed a final time. The degree of swelling and the soluble portion can be calculated. In another ASTM standard, F2214, the sample is placed in an instrument that measures the height change in the sample, allowing the used to measure the volume change and the cross-link density can then be calculated.

A synthetic polymer may be loosely described as crystalline if it contains regions of three-dimensional ordering on atomic (rather than macromolecular) length scales, usually arising from intramolecular folding and/or stacking of adjacent chains. The cross-linked polymeric resins described herein may consist of both crystalline and amorphous regions; the degree of crystallinity may be expressed in terms of a weight fraction of volume fraction of crystalline material. The crystallinity of polymers may be characterized by their degree of crystallinity, ranging from zero for a completely non-crystalline polymer to one for a theoretical completely crystalline polymer. In a preferred embodiment, the cross-linked polymeric resin of the present disclosure exhibits a semi-crystalline nature. In a preferred embodiment, the cross-linked polymeric resin series of the present disclosure has a degree of crystallinity in the range of 0.1-0.8, preferably 0.2-0.6, preferably 0.3-0.5. Polymers with microcrystalline regions are generally tougher (can be bent more without breaking) and more impact resistant than totally amorphous polymers. Polymers with a degree of crystallinity approaching zero or one will tend to be transparent, while polymers with intermediate degrees of crystallinity will tend to be opaque due to light scattering by crystalline or glassy regions. Polymers are known to behave in as crystalline materials under X-ray when their chains are closely packed in an orderly manner. A simple explanation for this behavior in the cross-linked polymeric resin described herein may result from a high chelating ability of the polymer or diol moieties. Chelation of suitable monocation $Z^+$ ions, such as for example $K^+$, or chelation of $Hg^{2+}$ in between the long polymer chains may result in a form of chain stacking by inter chain chelation. In a preferred embodiment, as the value of n and/or Y increases the degree of crystallinity of the cross-linked polymeric resin increases.

The size distribution, morphology, molecular structure, and properties of the cross-linked polymeric resin series described herein may vary with the value of m and/or Y. Polymer morphology generally describes the arrangement and microscale ordering of polymer chains in space. In a preferred embodiment, the polymer is dispersed into small nanometer sized structures. Preferably, the polymer is dispersed with a few structures having larger sizes of comparable shape and size having polyhedral architecture as revealed by atomic force microscopy (AFM). In a preferred embodiment, these particles have a width of 5-35 nm at the base, preferably 10-30 nm, preferably 12-25 nm, preferably 15-20 nm at the base and a height of 4-16 Å, preferably 6-14 Å, preferably 7-12 Å, preferably 8-10 Å and are characterized by steep slopes correlating with diffraction edges observable by x-ray diffraction (XRD). In certain embodiments, the structure of the dispersed polymer by scanning electron microscopy (SEM) may show a single cluster of the polymer (spherical with an average diameter of 5-20 µm, preferably 6-15, preferably 8-12 µm, or about 10 µm) with polycrystalline sides and high brightness due to strong electron refractions, whereas the un-clustered polymer structures my show a much smaller size. In a preferred embodiment, after heavy metal ion loading, such as Hg(II) loading of the cross-linked polymeric resin described herein under AFM 3D topography reveals polymer structures with a 10-40 nm base width, preferably 15-30 nm, preferably 20-25 nm base width and a height of 0.5-5.0 nm, preferably 1.0-4.0 nm, preferably 2.0-3.0 nm, or about 2.5 nm with less steep edges and the observation of larger polymer structures supported by SEM observation. In addition, the heavy metal loaded cross-linked polymeric resin may show a dark outer layer and lighter inner core where the outer layer is made of soft, peeled off polymer layers loaded with heavy metal ion (i.e. mercury). In certain embodiments, after prolonged heavy metal ion exposure phase and height images may demonstrate fully exfoliated sheets preferably having a uniform thickness of 0.5-5.0 nm, preferably 1.0-4.0 nm, preferably 1.5-3.0 nm, or about 2.0 nm in good agreement with the thickness of an individual monolayer.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area. In a preferred embodiment, the cross-linked polymeric resin of the present disclosure has a BET surface area in the range of 2.0-15.0 $m^2g^{-1}$, preferably 3.0-14.0 $m^2g^{-1}$, preferably 3.5-12.0 $m^2g^{-1}$, preferably 4.0-11.5 $m^2g^{-1}$. In certain embodiments, larger values of m and/or Y in the cross-linked polymeric resins of the present disclosure lead to larger surface areas, longer chains lead to larger pores and hence larger surface area. In one embodiment, the cross-linked polymeric resin of formula (IV) wherein m is 12 has a BET surface area that is at least 3 times the BET surface area of the cross-linked polymeric resin of formula (IV) wherein m is 4, preferably at least 2.75 times, preferably at least 2.5 times, preferably at least 2.0 times the BET surface area of the cross-linked polymeric resin of formula (IV) wherein m is 4.

Another aspect of the invention, the present disclosure relates to a process for producing a cross-linked polymeric resin formed by the condensation of a phenolic compound, aldehyde, and a diol (e.g., a glycol) to produce formula (IV) described herein in any of its embodiments, in particular formula (V) comprising reacting a phenol compound with a diol compound in the presence of an aldehyde to form the cross-linked polymeric resin. The method comprises heating a solution containing the reaction mixture in a solvent between 60-200 degrees Celsius.

In the process, a phenolic compound and a diol compound are linked together with an aldehyde compound via acid-catalyzed polycondensation to form ether linkages. As used herein a polycondensation refers to a polymerization or polymer formation that is a form of step growth polymerization where molecules join together losing small molecules as byproducts such as water or methanol, preferably water. This is in contrast to addition polymerizations which often involve the reaction of unsaturated monomers. The type of end product resulting from the polycondensation is dependent on the number of functional end groups of the monomeric molecules which can react. As used herein, the acid-catalyzed condensation reaction refers to a multicomponent organic reaction which comprises or consists of a phenol compound, a diol compound and an aldehyde compound. In certain embodiments, the reaction starts with the formation of condensation product formed between the phenol compound and the aldehyde compound to produce a benzyl alcohol compound via electrophilic substitution reactions. Once the benzyl alcohol compound is formed, it can undergo acid-catalyzed polymerization reaction with the diol to produce the cross-linked resin.

In a preferred embodiment, the reaction of the phenolic compound, the diol compound, and aldehyde is carried out in a non-polar solvent, preferably n-heptane as the reaction medium. Exemplary additional non-polar solvents that may be used in addition to, or in lieu of n-heptane include, but are not limited to pentane, cyclopentane, hexane, cyclohexane, benzene, toluene, 1,4-dioxane, chloroform, diethyl ether, dichloromethane, and mixtures thereof. It is equally envisaged that the reaction may be adapted to be performed in a polar aprotic solvent (i.e. tetrahydrofuran, ethyl acetate, acetone, dimethylformamide, acetonitrile, dimethyl sulfoxide, nitromethane and propylene carbonate), a polar protic solvent (i.e., formic acid and acetic acid), and mixtures thereof. In a preferred embodiment, the reaction is performed at a concentration of the phenolic compound in the range of 0.01-1.0 M, preferably 0.05-0.80 M, preferably 0.10-0.60 M, preferably 0.20-0.40 M, preferably 0.25-0.35 M.

In a preferred embodiment, the aldehyde is present in the reaction in a molar excess to the phenolic compound. In a preferred embodiment, the molar ratio of the aldehyde to the phenolic compound is in the range of 4:1 to 8:1, preferably 4.5:1 to 7.5:1, preferably 5:1 to 7:1, preferably 5.5:1 to 6.5:1, or about 6:1. In a preferred embodiment, the diol compound, oligomer or polymer thereof is present in the reaction in a molar equivalent or molar excess to the phenolic compound. In a preferred embodiment, the molar ratio of the diol compound, oligomer or polymer thereof to the phenolic compound is in the range of 1:1 to 5:1, preferably 1.5:1 to 4.5:1, preferably 2:1 to 4:1, preferably 2.5:1 to 3.5:1, or about 3:1. In a preferred embodiment, the molar ratio of the aldehyde to the the diol compound, oligomer or polymer thereof is in the range of 1.1:1 to 4:1, preferably 1.5:1 to 3:1, preferably 1.75:1 to 2.5:1, or about 2:1.

In a preferred embodiment, the reaction is performed under mechanical stirring, preferably a magnetic stirrer at a temperature of up to 115° C., preferably 20-110° C., preferably 40-105° C., preferably 60-100° C., preferably 80-95° C., or about 90° C. and has a stirred reaction time of up to 48 hours, preferably 2-44 hours, preferably 8-38 hours, preferably 12-32 hours, preferably 18-30 hours, or about 23 hours. In a preferred embodiment, this reaction results in a resinous material that may be separated (filtered off), crushed and soaked in water for up to 48 hours, preferably up to 36 hours, preferably up to 24 hours and then filtered and dried under vacuum at 20-100° C., preferably 40-80° C., or about 60° C. until a constant weight is achieved. In a preferred embodiment, this reaction has a yield of greater than 40%, preferably greater than 45%, preferably greater than 50%, preferably greater than 60%, preferably greater than 65%, preferably greater than 70%, preferably greater than 75%, preferably greater than 80%.

According to a third aspect, the present disclosure relates to a method for removing a heavy metal from an aqueous solution comprising i) contacting the cross-linked polymeric resin described herein in any of its embodiments with an aqueous solution comprising at least one heavy metal and ii) adsorbing the heavy metal onto the cross-linked polymeric resin to form a heavy metal loaded cross-linked polymeric resin.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the cross-linked polymeric resin of the present disclosure in any of its embodiments with heavy metal contaminated water sources and systems. The methods may be carried out in tanks, containers, or small scale applications in both batch mode and fixed-bed or column mode.

The heavy metal ion is preferably removed by adsorption, meaning the process is primarily physical and preferably no chemical changes are made upon the polymeric resin or the metal ion. As used herein, adsorption is the adhesion of atoms, ions or molecules from a gas, liquid, or dissolved solid to a surface. The process creates a film of an adsorbate (i.e. heavy metal ions) on the surface of an adsorbent (i.e. the cross-linked polymeric resin). This process differs from absorption, in which a fluid (the absorbate) permeates or is dissolved by a liquid or solid (the absorbent). Adsorption is a surface-based process while absorption involves the whole volume of the material. The term sorption encompasses both processes, while, desorption is the reverse of it. As used herein, chemisorption is a kind of adsorption which involves a chemical reaction between the adsorbate and adsorbent. New chemical bonds are generated at the adsorbent surface. In contrast with chemisorption is physisorption, which leaves the chemical species of the adsorbate and adsorbent intact and the electronic structure of the atom or molecule is barely perturbed upon adsorption. In terms of the present disclosure, the adsorption may be chemisorption, physisorption, or mixtures thereof.

As used herein, a ligand refers to in coordination chemistry an ion or molecule (functional group) that binds a central metal atom to form a coordination complex. The binding between metal and ligand generally involves formal donation of one or more of the ligand's electron pairs. The nature of the metal-ligand bonding can range from covalent to ionic and the metal-ligand bond order can range from one to three. Ligands are classified in many ways including, but not limited to, size (bulk), the identity of the coordinating atom(s), and the number of electrons donated to the metal (i.e. denticity or hapticity). Denticity refers to the number of times a ligand bonds to a metal through noncontiguous donor sites. Many ligands are capable of binding metal ions through multiple sites, usually because the ligands have lone pairs on more than one atom. A ligand that binds through one site is classified as monodentate, a ligand that binds through two sites is classified as bidentate, three sites as tridentate and more than one site as polydentate. Ligands that bind via more than one atom are often termed chelating. Complexes of polydentate ligands are called chelate complexes. As used herein, chelation is a particular type of way ions and molecules bind to metal ions. It involves the formation or presence of two or more coordinate bonds between a polydentate (multiple bonded) ligand and a single central atom. These ligands are often organic compounds and may be referred to as chelants, chelators, chelating agents, or sequestering agents. The chelate effect describes the enhanced affinity of chelating ligands for a metal ion compared to the affinity of a collection of similar non-chelating (i.e. monodentate) ligands for the same metal. In terms of the present disclosure, the cross-linked polymeric resin may adsorb or bind with one or more heavy metal ions by monodentate coordination, or polydentate chelation including, but not limited to bidentate chelation or tridentate chelation to the metal ion to form a heavy metal loaded cross-linked polymeric resin.

The performance of an adsorbent material, polymers inclusive, is largely dependent on the type of functionality it carries. The presence of chelating functionalities such as phenol, ether linkage, carbonyl, carboxyl, thiols, phosphoryl and amine moieties may enhance the performance of materials towards the removal of heavy metal ions from aqueous solutions. The moieties have an ability to form strong complexes with heavy metal ions such as mercury ($Hg^{+2}$). Cross-linked polymeric resins of the present disclosure, for example those of formula (IV) featuring at least one diol (e.g., glycol or ethylene glycol moiety, preferably a plurality of glycol or ethylene glycol moieties present in the same repeating unit) may be chemically modified to have one or more of the metal chelating functionality to enhance the binding of metal ions. In a preferred embodiment, each repeating unit in the cross-linked polymeric resin of the present disclosure of formula (IV) includes multiple ligand centers or chelating centers such as ether oxygen, carboxyl or amino moieties to which one or more heavy metal ions can be coordinated. In certain embodiments, the number of ligand centers in a repeating unit of the resin may depend on the values of n, Y, or both and is in the range of 1-250, preferably 2-200, preferably 5-175, preferably 10-150, preferably 15-100, preferably 20-75, preferably 25-50.

The metal ions that are coordinated to the plurality of ligands centers (i.e. ether oxygen moieties) are preferably heavy metal ions. In a preferred embodiment, a heavy metal has a density of greater than 3.5 g/cm$^3$ and/or an atomic weight of greater than 20. Exemplary metal ions that can be adsorbed by the cross-linked polymeric resin of the present disclosure are of a wide range and include, but are not limited to, ions of Ag, Na, Pb, Mn, Fe, Co, Ni, Cu, Sn, Cd, Hg, Cr, Fe, As, Sb, Cr, Zn, V, Pt, Pd, Rh and mixtures thereof. Further, these metal ions may be of any oxidation state $M^{+1}$, $M^{+2}$, $M^{+3}$, etc. In a preferred embodiment, the heavy metal is at least one selected from the group consisting Hg(II), Cu(II), Zn(II), Mn(II), Fe(II) and Ni(II), most preferably the heavy metal ion is Hg(II). It is equally envisaged that the cross-linked polymeric resin may be adapted or chemically modified to adsorb, incorporate and/or bind additional metal ions in addition to, or in lieu of Hg(II) and may bind selectively or collectively. In one embodiment, the additional metal ion may be any ion which is suitably coordinated by the cross-linked polymeric resin of formula (IV) in any of its embodiments. Exemplary additional metal ions include, but are not limited to, an alkali metal (Li, Na, K, etc.), and alkaline earth metal (Mg, Ca, Sr, etc.) a lanthanide metal (La, Ce, Eu, Yb, etc.) an actinide metal (Ac, Th, etc.) or a post-transition metal (Al, Sn, Pb, In, etc.). Preferably the additional metal ion is a transition metal ion, most preferably a heavy metal ion.

As used herein, the binding constant is a special case of the equilibrium constant (K or $K_a$). It is associated with the binding and unbinding reaction of receptor and ligand molecules. The reaction is characterized by the on-rate constant and the off-rate constant. In equilibrium, the forward binding transition should be balanced by the backward unbinding transition. The binding constant or association constant is defined by the on-rate constant divided by the off-rate constant or the concentration or the concentration of receptor-ligand complexes (i.e. heavy metal loaded polymeric resins) divided by the concentration of unbound free receptors and divided by the concentration of unbound free ligands. In certain embodiments, the binding of mercury ion to the cross-linked polymeric resins follows a greater than 1:1 stoichiometric complex formation, preferably greater than 2:1, preferably greater than 4:1, preferably greater than 8:1, preferably greater than 25:1, preferably greater than 50:1, preferably greater than 100:1, preferably greater than 200:1. In certain embodiments, a diol or glycol functionality of the cross-linked polymeric resin of formula (IV) in any of its embodiments has a Hg(II) binding constant in the range of $0.1\times10^7$ L·mol$^{-1}$ to $5.0\times10^7$ L·mol$^{-1}$, preferably $0.5\times10^7$ L·mol$^{-1}$ to $1.5\times10^7$ L·mol$^{-1}$, preferably $0.6\times10^7$ L·mol$^{-1}$ to $1.4\times10^7$ L·mol$^{-1}$, preferably $0.7\times10^7$ L·mol$^{-1}$ to $1.3\times10^7$ L·mol$^{-1}$, preferably $0.8\times10^7$ L·mol$^{-1}$ to $1.2\times10^7$ L·mol$^{-1}$, $0.9\times10^7$ L·mol$^{-1}$ to $1.1\times10^7$ L·mol$^{-1}$, preferably $0.95\times10^7$ L·mol$^{-1}$ to $1.05\times10^7$ L·mol$^{-1}$, or about $1.0\times10^7$ L·mol$^{-1}$. In a preferred embodiment, a diol or glycol functionality of the cross-linked polymeric resin of formula (IV) in any of its embodiments has a binding constant for metal ions that are not Hg(II) in the range of 1.0 to $1.0\times10^{-10}$ times its Hg(II) binding constant, preferably 0.1 to $1.0\times10^{-9}$ times, 0.01 to $1.0\times10^{-8}$ times, preferably 0.001 to $1.0\times10^{-7}$ times 0.0001 to $1.0\times10^{-5}$ times its Hg(II) binding constant.

In one embodiment, the cross-linked polymeric resin of the present disclosure is effective in removing heavy metal from aqueous samples wherein the initial concentration of the heavy metal ion, preferably Hg(II) in the aqueous solution is in the range of 0.05-1.0 mmol L$^{-1}$, preferably 0.1-0.9 mmol L$^{-1}$, preferably 0.2-0.8 mmol L$^{-1}$, preferably 0.25-0.75 mmol L$^{-1}$ or alternatively 5-500 ppm, preferably 10-200 ppm, preferably 15-100 ppm, preferably 20-80 ppm. In a preferred embodiment, the cross-linked polymeric resin is present in the aqueous solution and/or contacted with the aqueous solution within a concentration range of 0.02-5.0 grams of resin per liter volume of the treated aqueous solution, preferably 0.5-4.0 g L$^{-1}$, preferably 0.75-3.0 g L$^{-1}$, preferably 1.0-2.0 g L$^{-1}$ or 1.5 g L$^{-1}$ of the resin relative to the volume of the aqueous solution.

In a preferred embodiment, the cross-linked polymeric resin of the present disclosure has an adsorption capacity of at least 5 mg of heavy metal per g of the cross-linked polymeric resin, preferably at least 10 mg of heavy metal per g of the cross-linked polymeric resin, preferably at least 15 mg g$^{-1}$, preferably at least 20 mg g$^{-1}$, preferably at least 25 mg g$^{-1}$, preferably at least 30 mg g$^{-1}$, preferably at least 35 mg g$^{-1}$, preferably at least 40 mg of heavy metal per g of the cross-linked polymeric resin. In a preferred embodiment, the cross-linked polymeric resin of the present disclosure has an adsorption capacity in the range of 15-35 mg of heavy metal per g of the cross-linked polymeric resin, preferably 18-32 mg g$^{-1}$, preferably 20-30 mg g$^{-1}$, preferably 22-28 mg of heavy metal per g (total weight) of the polymeric resin.

In certain embodiments, up to 90% of the total mass of the heavy metal present in the aqueous solution is successfully removed from the aqueous solution at the end of the adsorption process following contacting, preferably up to 89%, preferably up to 88%, preferably up to 87%, preferably up to 86%, preferably up to 85%, preferably up to 80%, preferably up to 75%, preferably up to 70%, preferably up to 65%, preferably up to 60%, preferably up to 55%, preferably up to 50%, preferably up to 45%, preferably up to 40%, preferably up to 35%, preferably up to 30%, preferably up to 25%. In a preferred embodiment, greater than 90% of the total mass of the heavy metal present in the aqueous solution is successfully removed from the aqueous solution at the end of the adsorption process following contacting, preferably greater than 92%, preferably greater than 94%, preferably greater than 95%, preferably greater than 96%, preferably greater than 97%, preferably greater than 98%, preferably greater than 99%.

There are various parameters in the method under which heavy metal ions are removed from the aqueous solution. Parameters such as contact time, pH, temperature, and adsorbent dosages can be varied and their impacts on removal efficiency noted. In a preferred embodiment, the treatment and contacting process is carried out for 0.1 to 24 hours, preferably 0.25-12 hours, preferably 0.5-10 hours, preferably 1.0-8.0 hours, preferably 1.5-6.0 hours, preferably 2.0-5.0 hours, preferably 2.5-4.0 hours. The duration needs to be long enough to ensure sufficient contact time between adsorbent polymeric materials and heavy metal; however, if the process is left to run too long it's possible desorption may start to occur, resulting in bound heavy metal ions being released from the polymeric resin. In most instances, adsorption time requirements vary based on the nature of the interaction occurring between the adsorbent and the adsorbate. Generally, the adsorption by the polymeric resin of the heavy metal will increase with time, after which there is a slight and gradual decline in the adsorption. This is explained by the adsorption equilibrium phenomenon, in which the rate of adsorption is greater than the rate of desorption until equilibrium is reached at a certain contact time. At this time, the adsorption sites on the adsorbent may be saturated. Beyond this time, the rate of desorption is greater than the rate of adsorption, accounting for the slight and gradual decline in heavy metal ion adsorption beyond an optimum time. In one embodiment, greater than 90% of the total mass of the metal ion present in the aqueous solution is successfully removed from the aqueous solution within the first 2 hours of contacting, preferably within the first 1.5 hours, preferably within the first 1.0 hour, preferably within the first 0.5 hour, preferably within the first 0.25 hour of contacting.

In a preferred embodiment, the method for removing heavy metal is carried out at an aqueous solution pH range of 2.0-12.0, preferably 2.0-9.0, preferably 3.0-7.0, preferably 3.5-6.5, preferably 4.0-6.0, preferably 4.5-6.5. In certain embodiments, the cross-linked polymeric resin of the present disclosure is effective in adsorbing heavy metal ions in an aqueous solution within a temperature range of 10-100° C., preferably 20-80° C., preferably 25-60° C., preferably 25-40° C., preferably 25-30° C. or room temperature. In a preferred embodiment, the contacting is performed at a temperature in the range of 20-60° C., preferably 25-50° C., preferably 30-45° C., preferably 32-40° C., preferably 35-38° C.

In certain embodiments, the method further comprises agitation of the aqueous solution before, during or after the contacting. The agitation may encompass shaking, stirring, rotating, vibrating, sonication and other means of increasing contact between the adsorbent and the adsorbate. Further, the agitation can be performed by hand or mechanically. In one embodiment, the treatment and contacting process may be enhanced by mechanical shaking or agitation, preferably by a bath shaker at a speed of up to 300 rpm, preferably up to 250 rpm, preferably up to 200 rpm, preferably 50-200 rpm, preferably 75-175 rpm, preferably 100-150 rpm in order to increase contact between the adsorbent (cross-linked polymeric resin) and adsorbate (heavy metal ions). Adsorption is the key mechanism of removing heavy metals in the present disclosure; a requirement is contact between the adsorbent material and the target adsorbate. There is generally an increase in the removal efficiency with increasing agitation speed until a certain level. Any poor removal of heavy metal ions at lower agitation speeds may be attributable to a lack of contact between the active adsorption sites of the polymeric resin and the heavy metal ions as adsorbents may have settled in the vessel the method is carried out in.

In a preferred embodiment, the method further comprises recovering and reusing the heavy metal loaded cross-linked polymeric resin. In certain embodiments, the cross-linked polymeric resin may be removed and recovered from the aqueous solution with methods including, but not limited to, filtration, centrifugation, evaporation, heated evaporation and the like, preferably filtration or centrifugation, most preferably filtration. In certain embodiments, the separated and recovered heavy metal loaded cross-linked polymeric resin may be washed several types with an appropriate solvent to remove all materials present after each round of heavy metal absorption before being desorbed of the heavy metal and reused and/or recycled in another round of removal of heavy metal ions from aqueous solution.

In certain embodiments, the method may further comprise i) desorbing the heavy metal loaded cross-linked polymeric resin by treating with an acid to reform the cross-linked polymeric resin and ii) reusing the cross-linked polymeric resin up to 15 times without a loss in adsorption capacity. In this manner the cross-linked polymeric resin can be recycled and/or reused in another contacting, adsorbing and removal. The a preferred embodiment, the cross-linked polymeric resin can be desorbed and reused up to 15 times without a loss in adsorption capacity, preferably up to 12 times, preferably up to 10 times, preferably up to 8 times, more preferably up to 5 times. In certain embodiments, the cross-linked polymeric resin of the present disclosure can be regenerated and reused as a heavy metal adsorbent for at least 5 cycles with minimal, if any, decrease in adsorption efficiency, no more than a 25% decrease in Hg(II) removal with each regeneration cycle, preferably no more than a 20% decrease, preferably no more than a 15% decrease, preferably no more than a 10% decrease, preferably no more than a 5% decrease, preferably no more than a 2% decrease in Hg(II) removal with each regeneration cycle.

In one embodiment, to regenerate the adsorbent, metal ions are desorbed from the cross-linked polymeric resin of formula (I) by treating or immersing the heavy metal loaded cross-linked polymeric resin in an acidic solution of 0.05-5.0 M in concentration, preferably 0.075-1.0 M, preferably 0.1-0.5 M in concentration for up to 48 hours, preferably up to 36 hours, preferably up to 24 hours, preferably up to 12 hours. Strong acids including, but not limited to, HCl, $H_2SO_4$, and $HNO_3$ are preferred, but organic acids and weak acids (i.e. acetic acid) may also be used in the desorption process, most preferably $HNO_3$.

In one embodiment, the metal ion removal or adsorption process by the cross-linked polymeric resin is an endothermic process, as indicated by a determined positive $\Delta H$ value, preferably greater than 2 kJ/mol, preferably greater than 4 kJ/mol, preferably greater than 6 kJ/mol, preferably greater than 8 kJ/mol, preferably greater than 10 kJ/mol, preferably greater than 12 kJ/mol. In one embodiment, the metal ion removal or adsorption process by the cross-linked polymeric resin is a spontaneous process as indicated by a determined negative $\Delta G$ value, preferably $-1$ to $-10$ kJ/mol, preferably $-2$ to $-5$ kJ/mol, preferably $-3$ to $-4$ kJ/mol. In certain embodiments, the rate determining and/or controlling step in the adsorption mechanism of heavy metal ion by the cross-linked polymeric resin described herein is intraparticle diffusion as modeled by the intraparticle diffusion method. The intraparticle diffusion model describes the adsorption process in three consecutive steps: film diffusion; diffusion of metal ions through a liquid film surrounding the adsorbate, intraparticle diffusion; diffusion of polymer structures through the pores of the adsorbent, and finally mass action; the adsorption and desorption of metal ions between the active sites and adsorbate. In certain embodiments, the adsorption process is monolayer adsorption as modeled by a Langmuir isotherm. The Langmuir isotherm assumes monolayer adsorption wherein one metal ion occupies one active site. It is equally envisaged that the present disclosure may be adapted such that the adsorption process is heterogeneous with uniform energy distribution as modeled by a Feundlich isotherm model. In certain embodiments, the adsorption has a low activation energy or potential barrier, preferably less than 20 kJ/mol, preferably less than 10 kJ/mol, preferably less than 5 kJ/mol, preferably less than 2 kJ/mol, preferably less than 1 kJ/mol. The low activation energy indicates that the adsorption process is favorable and may be predominantly physisorption rather than chemisorption. The physisorption process is readily reversible, equilibrium is attained rapidly and thus the energy requirements are small (i.e. <40 kJ/mol). The chemisorption mechanism is specific and involves stronger forces, and thus requires larger activation energy (i.e. >40 kJ/mol).

A fourth aspect of the invention relates to a method of analyzing the metal ion content of a sample. The method comprises loading a sample on a column or cartridge packed with material comprising the resin of the invention under condition wherein the metal ions are bound to the resin, and eluting the metal ions from the column. The metal ion can be eluted by isocratic or gradient. The gradient can be a solvent gradient, salt gradient, or pH gradient. Isocratic elution can utilize one solvent or combination of solvents with and without additive. The solvent can be selected from the group consisting of acetonitrile, methanol, ethanol, propanol, isopropanol, water, and combination thereof. The additive can be 0.1%-1.0% mineral acid such as hydrochloric acid, sulfuric acid, or nitric acid or an organic acid such as formic acid, acetic acid or trifluoroacetic acid. Also, salt additive such as sodium or potassium chloride, sodium or potassium acetate, sodium or potassium oxalate, sodium or potassium tartrate or citrate can improve the separation and elution of the metal ions. The solvent gradient can be organic/aqueous gradient such as acetonitrile-water, water-alcohol such as methanol, ethanol, propanol, isopropanol, and combination thereof. Acid or salt additives can be added to the gradient cocktails. In a preferred embodiment, a pH gradient is utilized using water-dilute acid solution. The concentration of the acid solution can vary depending on the resin used and the metal ion present. The acid concentration can vary between 0.1-5.0 M, 0.1-4.0 M, 0.1-3.0, 0.1-2.0 M, 0.1-1.0 M, 0.1-0.5 M, or 0.1-0.5 M. Any suitable acid such as hydrochloric acid, sulfuric acid, nitric acid, acetic acid, formic acid, tartaric acid, or citric acid can be used.

The examples below are intended to further illustrate methods protocols for preparing and characterizing the cross-linked polymeric resins of the present disclosure. Further, they are intended to illustrate assessing the properties of these compounds. They are not intended to limit the scope of the claims.

EXAMPLE 1

Materials and Methods:

Phenol (Ph), ethylene glycol (EG), diethylene glycol (DEG), triethylene glycol (TEG) and Tetraethylene glycol (TETA) and paraformaldehyde were purchased from Fluka Chemie AG (Buchs, Switzerland). heptane was supplied by Sigma-Aldrich, Germany. All other solvents and reagents employed were of analytical grade. The infrared spectra were recorded were analysed by Perkin Elmer 16F PC FTIR spectrometer in the 4000-500 cm-1 wavelength region. The solid NMR spectra were recorded by Bruker WB-400 spectrometer with a spinning rate of 10 KHz. The cross-linked polymers were analysed for powder xray diffraction by Rigaku Miniflex II Desktop X-ray Diffractometer with 30 and stop angle of 700 sampling step size of 0.03, scan speed 3.00, 30 KV and 15 mA. The concentrations of mercury samples before and after analysis were analysed Inductively Coupled Plasma Mass Spectroscopy model ICP-MS XSeries-II (Thermo Scientific). Thermal properties of the synthesized cross-linked polymers were performed on NETZSCH Thermal Analyzer, model DSC 204 F1 Phoenix and TG 209 F1 Libra, respectively.

EXAMPLE 2

Synthesis and Characterization:

In a typical experiment: phenol (0.05 mol), glycol (0.15 mol), paraformaldehyde (0.3 mol) and concentrated hydrochloric acid (0.02 mol) were mixed in 25 ml of heptane in a 50 round bottom flask. The reaction mixture was heated and stirred at 80° C. for 24 hours. The light yellow solid produced was crushed and washed in distilled water and methanol, and dried at 60° C. under vacuum until constant weight was achieved (See Table 1, Scheme 1).

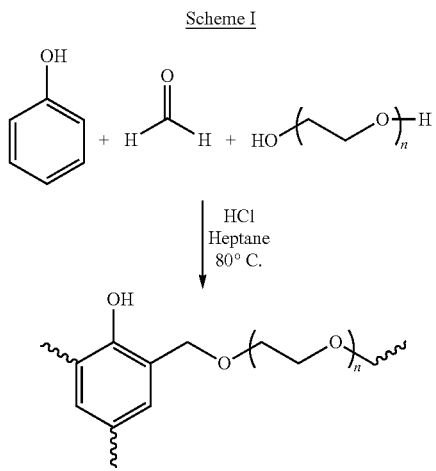

Scheme I n = 1, 2, 3, 4.

TABLE 1

Reaction yield and elemental analysis of the synthesized phenol-glycol based cross-linked polymers.

| Polymer | *Yield (%) | Elemental analysis (%) | |
| --- | --- | --- | --- |
| | | C | H |
| Ph-EG | 39.11 | 38.91 | 6.76 |
| Ph-DEG | 32 | 38.49 | 7.08 |
| Ph-TEG | 33.6 | 41.14 | 6.41 |
| Ph-TETA | 26.5 | 41.75 | 7.15 |

*Reaction yield was calculated by = mass of product/mass of reactants × 100%, (reactants = phenol, formaldehyde, glycol and hydrochloric acid)).

EXAMPLE 3

Adsorption Studies:

The adsorption experiments were performed as batch experiments, where experiments were conducted as follow: a 20 ml solution of mercury at a certain concentration, certain pH and certain temperature was added 30 mg of cross-linked polymer and stirred for a certain time [Al Hamouz O C S, Estatie M, Saleh T A. "Removal of cadmium ions from wastewater by dithiocarbamate functionalized pyrrole based terpolymers." Sep Purif Technol. 2017; 177: 101-109]. The concentrations of mercury (II) ions before and after the adsorption were analyzed by ICP. And the adsorption capacity was calculated:

$$qe = \frac{(Co - Ce) \times V}{W} \quad (1)$$

Where qe represents the adsorption capacity (mg/g), Co and Ce represents the initial concentration of mercury ions and the concentration of mercury ions left in the solution after adsorption, respectively (mg/L). V represents the volume of the solution (L) and W represents the mass of the polymers inserted in the solution (g).

EXAMPLE 4

Characterization of the Phenol-Glycol Cross-Linked Polymers by FT-IR

FIG. 1 represents the FT-IR spectra of the synthesized polymers. The FT-IR spectra reveal an intense peak ~3450 cm$^{-1}$ attributed to the —OH stretching of the phenol ring and the glycol end group chains. Two peaks ~2935 cm$^{-1}$ are attributed —CH stretching vibrations for the phenolic and aliphatic methylene hydrogens of the glycol moieties were the intensity increases incrementally from Ph-EG to Ph-TETA. Two peaks ~1620 cm$^{-1}$ and ~1500 cm$^{-1}$ are attributed to —C=C— aromatic bonds in the phenolic ring. Two intense peaks ~1200 cm$^{-1}$ and 1000 cm$^{-1}$ that increases as the glycol moiety increases from ethylene glycol to Tetraethylene glycol, which is attributed to —C—O— and —C—OH bonds present in the phenol and glycol moieties.

$^{13}$C-NMR Spectra of the Synthesized Phenol-Glycol Cross-Linked Polymers (*=Side Band).

Figure 2:
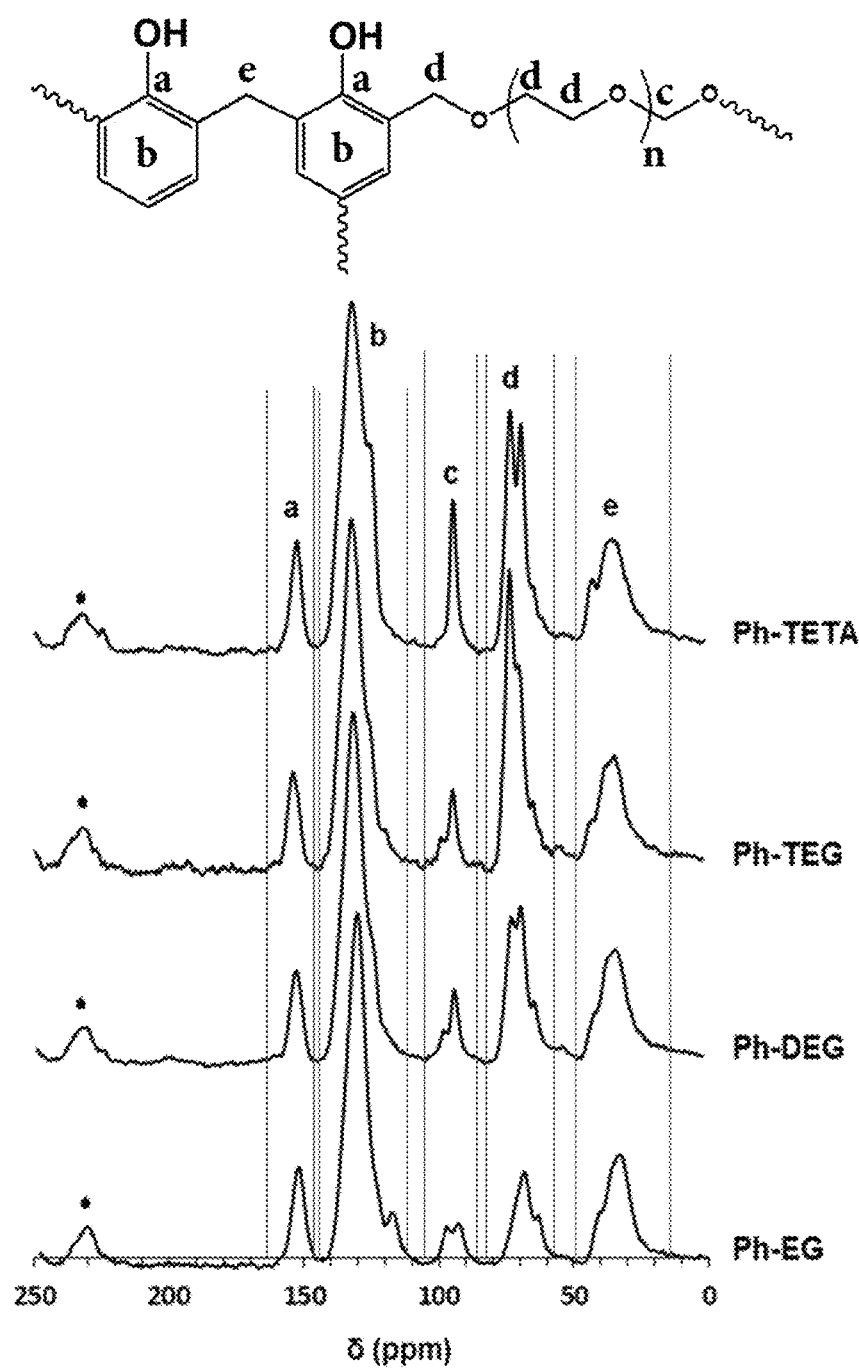
FIG. 2. $^{13}$C-NMR spectra of the synthesized phenol-glycol cross-linked polymers (*=side band).

FIG. 2 represents the solid $^{13}$C-NMR spectra of the synthesized phenol-glycol cross-linked polymers. The peaks interpretation is explained as follows: a peak at ~152 ppm is attributed to the phenolic carbon attached to the hydroxyl group. A peak ~127 ppm is attributed to the aromatic carbons of the phenol ring not attached to the hydroxyl group. A peak around ~95 ppm is attributed to the glycol-glycol condensation with formaldehyde and the peak intensity increases as the chain of the glycol moiety increases. Two close peaks around ~70 ppm are attributed to the glycol methylene carbons and to the methylene attached directly to the phenol ring. A peak ~30 ppm is attributed to the condensation reaction between two phenols with formaldehyde.

Thermogravimetric Analysis

Figure 3A:
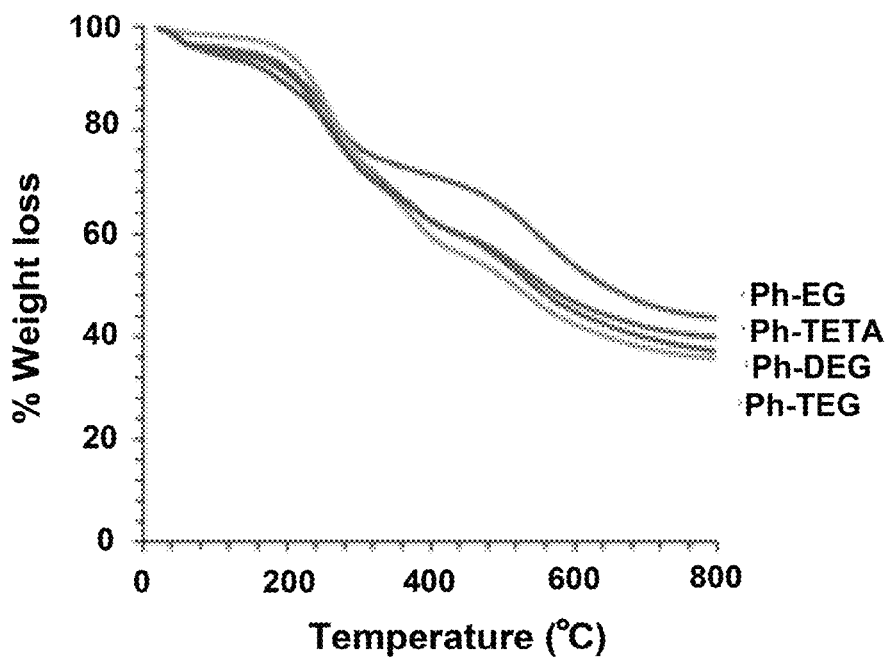
FIGS. 3A-3B.
Figure 3B:
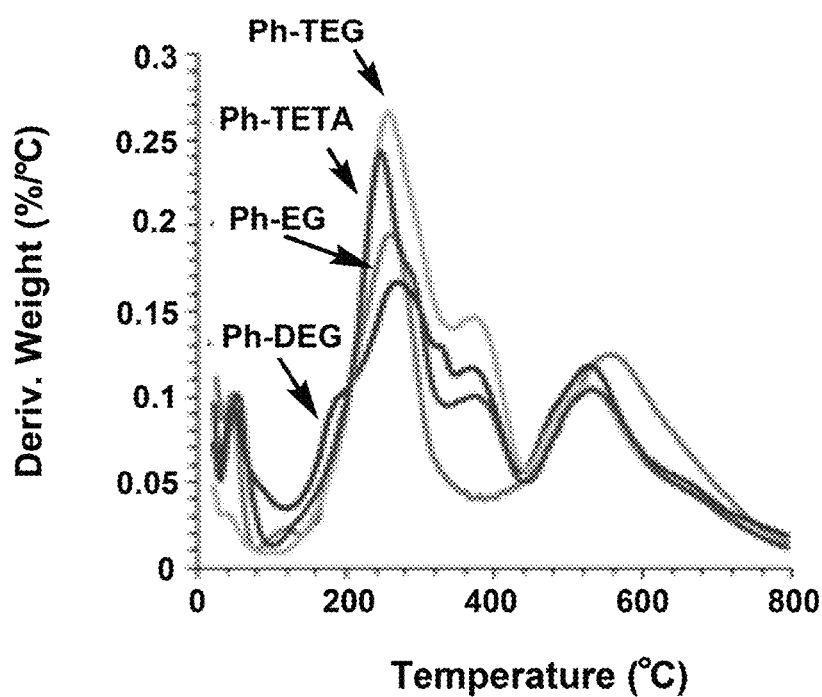

FIGS. 3a & 3b, depicts the thermogravimetric analysis for the synthesized polymers, and from the figure the initial loss in weight is due to solvent loss embedded in the cross-linked polymers at ~70° C. The major loss in weight is shown as three distinct decomposition patterns; the first decomposition pattern is ~200° C. which could be associated water loss due to extensive condensation reactions occurring between hydroxyl end chains and decomposition of ethylene glycol moiety found in Ph-EG. Whereas the rest of the polymers a second thermal decomposition pattern ~380° C. is attributed to the loss of the glycol units. The final decomposition pattern ~580° C. could be associated with the carbonization and the pyrolysis of the aromatic phenolic moieties which can be shown by ~40% of the cross-linked polymers are still left present at ~800° C. [Kalbende P P, Tarase M V, Zade A B. "Preparation, Characterization, and Thermal Degradation Studies of p-Nitrophenol-Based Copolymer." Journal of Chemistry. 2013; 2013: 9; Solyman W S E, Nagiub H M, Alian N A, Shaker N O, Kandil U F. "Synthesis and characterization of phenol/formaldehyde nanocomposites: Studying the effect of incorporating reactive rubber nanoparticles or Cloisite-30B nanoclay on the mechanical properties, morphology and thermal stability." Journal of Radiation Research and Applied Sciences. 2017; 10(1): 72-79; and Chieng B, Ibrahim N, Yunus W, Hussein M. "Poly(lactic acid)/Poly(ethylene glycol) Polymer Nanocomposites: Effects of Graphene Nanoplatelets." Polymers. 2014; 6(1): 93].

Figure 4:
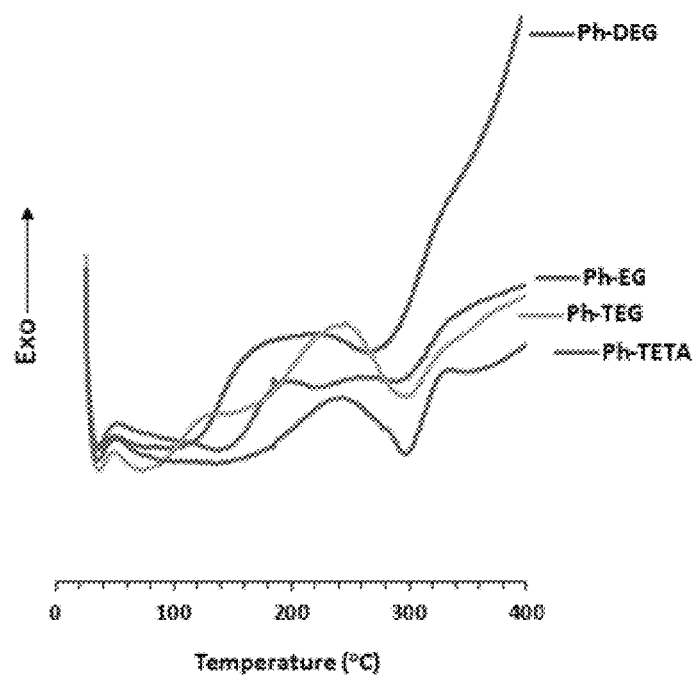
FIG. 4. Differential scanning calorimetry of the synthesized cross-linked phenol-glycol based polymers.

FIG. 4 represents the differential scanning calorimetry of the synthesized cross-linked polymers. From the figure the glass transition temperature for the cross-linked polymers is found ~80° C. The thermograms reveal the presence of a two crystallization peaks which are not present in Ph-TETA. The first crystallization peak for Ph-TEG is shown at ~110° C. then Ph-DEG at ~150° C. followed by Ph-EG at ~180° C. in which longer glycol moiety found in Ph-TEG arises with more flexibility and lower temperature for crystallization to occur. The second crystallization peak for Ph-TEG, Ph-DEG and Ph-EG is found at ~250° C. Ph-TETA thermogram showed one crystallization peak found around 250° C. After that the cross-linked polymers loses the glycol moieties which are shown by the decomposition peaks that starts ~300° C.

X-Ray Diffraction Patterns of the Synthesized Phenol-Glycol Cross-Linked Polymers.

Figure 5:
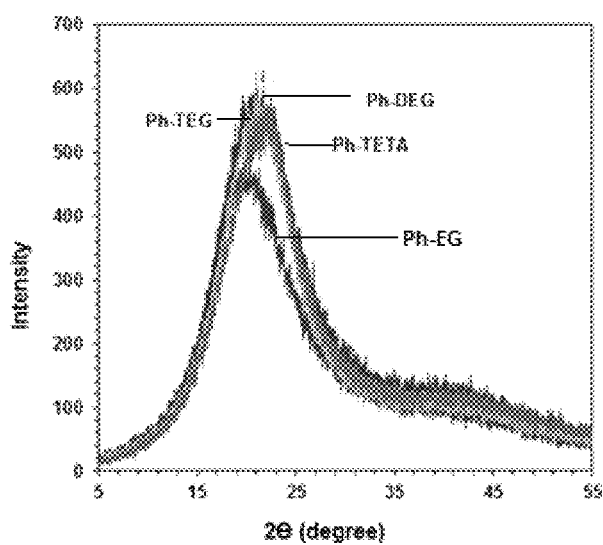
FIG. 5. X-ray diffraction patterns of the synthesized phenol-glycol cross-linked.

FIG. 5 reveals the powder x-ray diffraction patterns of the synthesized cross-linked polymers, the x-ray patterns reveal the amorphous nature of the polymers, with an increase in crystallinity as the chain length of the glycol moieties increase due to better packing in the polymeric structure [Al Hamouz O C S, Estatie M, Saleh T A. "Removal of cadmium ions from wastewater by dithiocarbamate functionalized pyrrole based terpolymers." Sep Purif Technol. 2017; 177: 101-109.].

EXAMPLE 5

Figure 6:
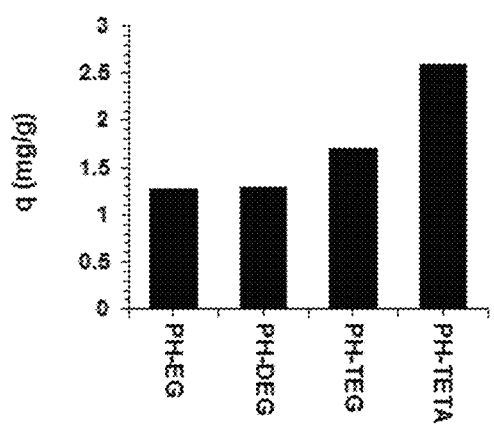
FIG. 6. Comparison between different cross-linked polymers to the removal of mercury (II) ions.

Adsorption Properties:

The adsorption properties of the synthesized cross-linked polymers were investigated toward their efficiency in the removal of mercury (II) ions from aqueous solutions. First the cross-linked polymers were differentiated in order to extract the best cross-linked polymer as shown from FIG. 6. The experiment was performed by immersing 30 mg of each cross-linked polymers in 20 ml of 5 ppm mercury (II) solution and stirred for 3 hours at pH=3.05 (normal pH of 5 ppm mercury solution). From the figure Ph-TETA was found to be the most efficient, which could be attributed to the high concentration of oxygen atoms in the polymer backbone. The rest of the adsorption studies were performed on Ph-TETA due its higher efficiency.

Figure 7:
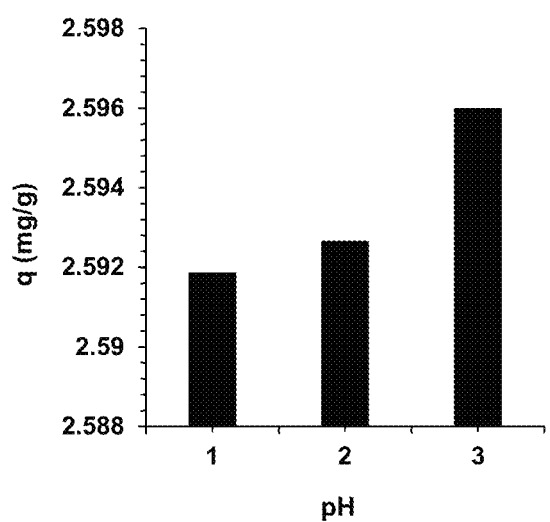
FIG. 7. Effect of pH on the removal of Hg (II) from solution using the TETG cross-liked resin.

Effect of pH:

The effect of pH for Ph-TETA was studied from pH=1-3, because of the pH of a 5 ppm aqueous solution of mercury is found to be 3. The results in FIG. 7 reveal that as the pH of the solution increases the adsorption capacity of Ph-TETA increases, which could be explained by as the pH increases less of protonated oxygens are available for the adsorption of mercury ions. Whereas, at lower pH values the competition between H$^+$ protons and mercury (II) ions increase. The interesting feature of these polymers is that they adsorb at low pH.

Figure 8A:
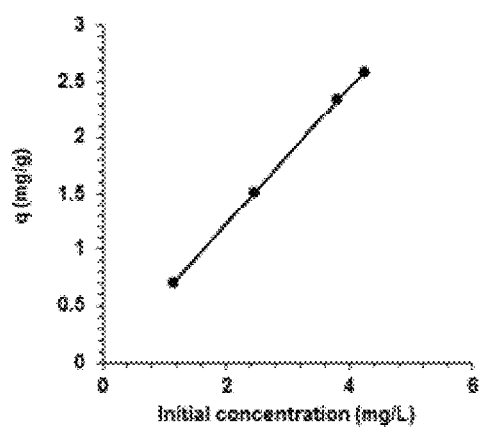
FIGS. 8A-8C.
Figure 8B:
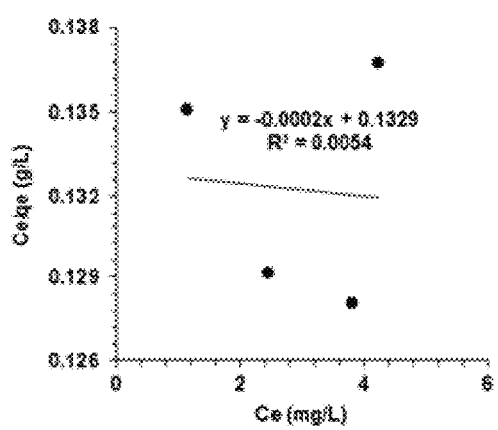

Effect of Initial Concentration:

From FIG. 8a; the adsorption capacity increases with the increase of concentration. Two isotherm models were applied in order to investigate the experimental data. The Langmuir isotherm model which assumes that the adsorption process is homogeneous in nature and that each adsorption site is occupied with one adsorbate ion [Al Hamouz O C S, Estatie M, Saleh T A. "Removal of cadmium ions from wastewater by dithiocarbamate functionalized pyrrole based terpolymers." Sep Purif Technol. 2017; 177: 101-109; and Edris G, Alhamed Y, Alzahrani A. "Biosorption of Cadmium and Lead from Aqueous Solutions by Chlorella vulgaris Biomass: Equilibrium and Kinetic Study." Arab J Sci Eng. 2014; 39(1): 87-93]. The linear form of the equation is expressed as follows:

$$\frac{C_e}{q_e} = \frac{C_e}{Q_m} + \frac{1}{bQ_m} \quad (2)$$

where, Ce is the concentration of metal ions left in the solution after adsorption (mg/L). qe represents the adsorption capacity at equilibrium (mg/g). Qm and b represent the maximum adsorption capacity (mg/g) and Langmuir constant which can be found from the slope and intercept of plotting Ce/qe vs Ce as shown in FIG. 8b (Table 2). From the figure the adsorption process doesn't fit the model as expressed by the regression value of $R^2$=0.0054 [Yadanaparthi S K R, Graybill D, von Wandruszka R. "Adsorbents for the removal of arsenic, cadmium, and lead from contaminated waters." J Hazard Mater. 2009; 171(1-3): 1-15; and Tao Y, Ye L, Pan J, Wang Y, Tang B. "Removal of Pb(II) from aqueous solution on chitosan/TiO2 hybrid film. J Hazard Mater." 2009; 161(2-3): 718-722].

Figure 8C:
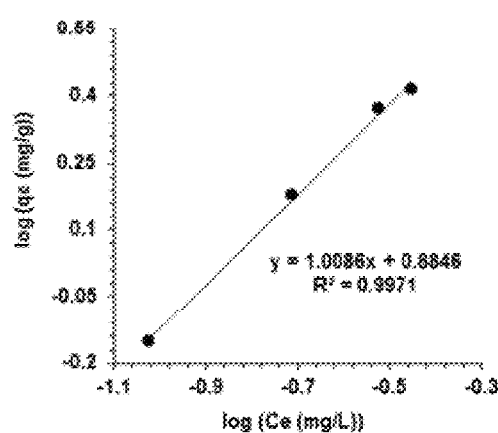

The second isotherm model applied is freundlich isotherm model; which implies that the adsorption is heterogeneous in nature assuming multilayer adsorption [Al Hamouz O C S, Amayreh M Y. "Removal of lead(II) and nickel(II) ions from aqueous solution via Bermuda grass biomass." Journal of Water Supply Research and Technology-Aqua. 2016; 65(6): 494-503.]. The linear form of the model is expressed as follows:

$$\log q_e = \log k_F + \frac{1}{n} \log C_e \quad (3)$$

where $k_f$ and 1/n represents freundlich isotherm model constants, which can be calculated from the intercept and slope, respectively, by plotting log qe vs log Ce as shown in FIG. 8c(Table 2). From the figure the regression value of $R^2$=0.9971 assumes that the adsorption process fits the freundlich model and heterogeneous in nature. The value of 1/n=1.01 assumes that the adsorption is cooperative in nature. The value $k_f$ was found=7.67; which represents the affinity toward the adsorbate [ Liu J, Ma Y, Xu T, Shao G. "Preparation of zwitterionic hybrid polymer and its application for the removal of heavy metal ions from water. J Hazard Mater." 2010; 178(1-3): 1021-1029; Wang L, Yang L, Li Y, Zhang Y, Ma X, Ye Z. "Study on adsorption mechanism of Pb(II) and Cu(II) in aqueous solution using PS-EDTA resin". Chem Eng J (Amsterdam, Neth). 2010; 163(3): 364-372; and Bessbousse H, Rhlalou T, Verchere J F, Lebrun L. "Mercury removal from wastewater using a poly(vinylalcohol)/poly(vinylimidazole) complexing membrane." Chemical Engineering Journal. 2010; 164(1): 37-48].

TABLE 2

Langmuir and freundlich isotherm model constants for the adsorption of mercury (II) ions by Ph-TETA.

| | Langmuir Isotherm Model | | |
| --- | --- | --- | --- |
| | Qm (mg/g) | b (L/mg) | $R^2$ |
| Metal ion | −5.00 × 10³ | −1.50 × 10⁻³ | 0.0054 |

TABLE 2-continued

Langmuir and freundlich isotherm model constants for the adsorption of mercury (II) ions by Ph-TETA.

| | Freundlich Isotherm Model | | |
| --- | --- | --- | --- |
| | $k_f$ | 1/n | $R^2$ |
| $Hg^{2+}$ | 7.67 | 1.01 | 0.9971 |

Figure 9A:
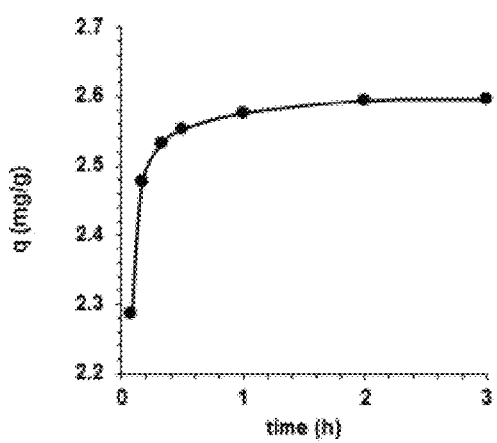
FIGS. 9A-9C.

Effect of Time:

As shown in FIG. 9a; the adsorption capacity increases with time and reaches equilibrium within 1 hour, indicating the efficiency of the Ph-TETA as an adsorbent for the removal of mercury ions from aqueous solutions. In order to better understand the kinetics of the adsorption process pseudo first-order and second-order kinetic models are applied to the experimental data. The pseudo first-order kinetic model assumes that the adsorption process is considered physisorption, whereas the pseudo second-order kinetic model assumes that the adsorption process is chemisorption in nature [Farghali A A, Bahgat M, Enaiet Allah A, Khedr M H. "Adsorption of Pb(II) ions from aqueous solutions using copper oxide nanostructur es." Beni-Suef University Journal of Basic and Applied Sciences. 2013; 2(2):61-71].

Figure 9B:
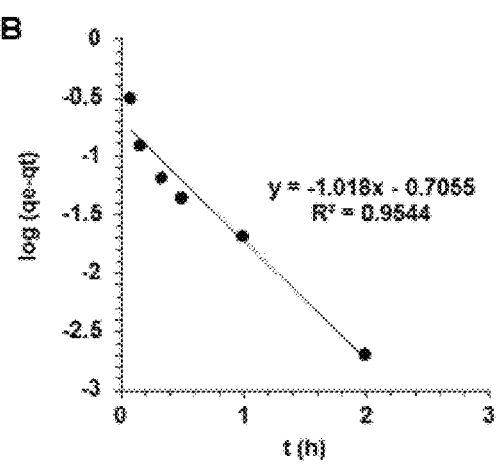

The linear form of the Pseudo first-order is expressed as follows:

$$\log(qe - qt) = \log qe - \frac{k_1 t}{2.303} \quad (4)$$

where qt represents the adsorption capacity at time t (mg/g). $k_1$ is the first order rate constant. qe and $k_1$ can be calculated from the plot of log(qe−qt) vs t as shown in FIG. 9b (Table 3). From the figure the regression value $R^2$=0.9544, assumes that the data fits the pseudo first-order model, but the calculated adsorption capacity ($qe_{(calc.)}$=0.2) differs from the experimental value ($qe_{(exp)}$=2.59) which concludes that the experimental data doesn't fit the pseudo first-order model [Farghali A A, Bahgat M, Enaiet Allah A, Khedr M H. "Adsorption of Pb(II) ions from aqueous solutions using copper oxide nanostructures." Beni-Suef University Journal of Basic and Applied Sciences. 2013; 2(2):61-71; Dabrowski A. "Adsorption—from theory to practice." Adv Colloid Interface Sci. 2001; 93(1-3): 135-224; Karatas M. "Removal of Pb(II) from water by natural zeolitic tuff: Kinetics and thermodynamics." J Hazard Mater. 2012; 199-200: 383-389].

Figure 9C:
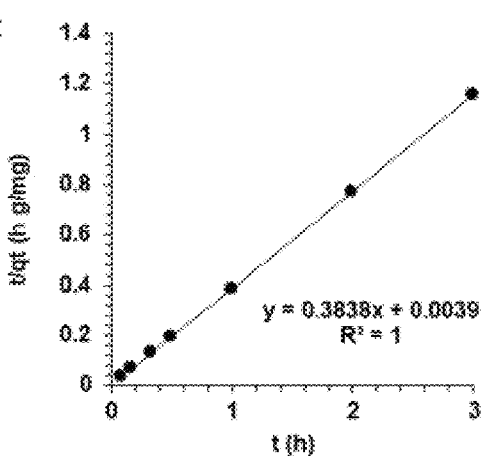

The linear form of the pseudo second-order kinetic model is expressed as follows:

$$\frac{t}{q_t} = \frac{1}{k_2 q_e^2} + \frac{t}{q_e} \quad (5)$$

where $k_2$ represents the rate constant of the second-order model. $k_2$ and qe can be calculated from the slope and intercept of the plot of t/qt vs t as shown in FIG. 9c (Table 3). The results show that the experimental data fit the model with a regression value of $R^2$=1, which assumes that the adsorption process is chemisorption in nature [Farghali A A, Bahgat M, Enaiet Allah A, Khedr M H. "Adsorption of Pb(II) ions from aqueous solutions using copper oxide nanostructures." Beni-Suef University Journal of Basic and Applied Sciences. 2013; 2(2): 61-71; Dabrowski A. "Adsorption—from theory to practice." Adv Colloid Interface Sci. 2001; 93(1-3): 135-224; Karatas M. "Removal of Pb(II) from water by natural zeolitic tuff: Kinetics and thermodynamics." J Hazard Mater. 2012; 199-200: 383-389].

TABLE 3

Pseudo first-order and Pseudo second-order kinetic model constants for the adsorption of mercury (II) ions by Ph-TETA.

| | Pseudo first-order kinetic model | | | |
|---|---|---|---|---|
| | $qe_{(exp)}$ (mg/g) | $qe_{(calc)}$ (mg/g) | $k_1$ | $R^2$ |
| Metal ion | 2.59 | 0.20 | 2.34 | 0.9544 |

| | Pseudo second-order kinetic model | | | |
|---|---|---|---|---|
| | $qe_{(exp)}$ (mg/g) | qe(calc) (mg/g) | $k_2$ | $R^2$ |
| $Hg^{2+}$ | 2.59 | 2.61 | 37.93 | 1.000 |

Figure 10A:
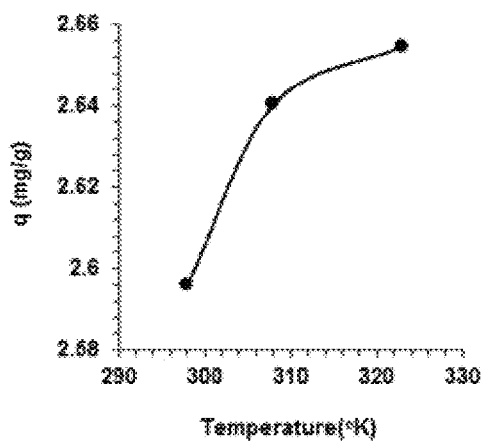
FIGS. 10A-10B.
Figure 10B:
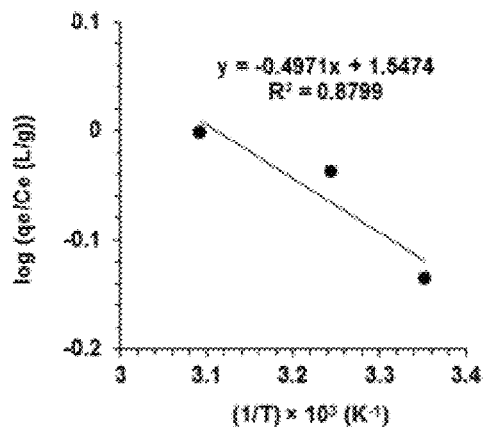

Effect of Temperature:

As can be seen in FIG. 10A as the temperature increases the adsorption capacity of PH-TETA increases, which could be explained by the increase in pore size of the cross-linked polymer by temperature allowing more and more mercury ions infuse through the polymer and be adsorbed. In order to investigate the thermodynamic parameters ($\Delta G$, $\Delta H$, $\Delta S$), the experimental data were applied on Vant-Hoff linear equation which is expressed as follows (FIG. 10B Table 4) [Coşkun R, Soykan C, Saçak M. "Removal of some heavy metal ions from aqueous solution by adsorption using poly (ethylene terephthalate)-g-itaconic acid/acrylamide fiber." Reactive and Functional Polymers. 2006; 66(6): 599-608.]:

$$\log\left(\frac{q_e}{C_e}\right) = -\frac{\Delta H}{2.303\,RT} + \frac{\Delta S}{2.303R} \quad (6)$$

By plotting log (qe/Ce) vs 1/T, the enthalpy ($\Delta H$) and entropy ($\Delta S$) of the adsorption process can be calculated. The results reveal that $\Delta H$=9.52 kJ/mol, which reveals that the process is endothermic in nature. $\Delta S$=29.63 J/mol, which is positive and it could be explained by the release of the hydration shell water molecules surrounding the mercury ions. Gibbs free energy ($\Delta G$) reveals that as the temperature increases the reaction is more and more spontaneous in nature [Coşkun R, Soykan C, Saçak M. "Removal of some heavy metal ions from aqueous solution by adsorption using poly(ethylene terephthalate)-g-itaconic acid/acrylamide fiber." Reactive and Functional Polymers. 2006; 66(6): 599-608.].

TABLE 4

Thermodynamic data for the removal of mercury ions by Ph-TETA.

| Metal ion | Temperature (K) | $\Delta G$ (kJ/mol) | $\Delta H$ (kJ/mol) | $\Delta S$ (J/mol) | $R^2$ |
|---|---|---|---|---|---|
| $Hg^{2+}$ | 298 | 0.69 | 9.52 | 29.63 | 0.8799 |
| | 313 | 0.39 | | | |
| | 328 | −0.20 | | | |

The invention claimed is:

1. A method for producing a cross-linked polymeric resin, comprising:
   mixing a phenol compound, an oligomer of the phenol compound, or a polymer of the phenol compound; a diol, an oligomer of the diol, or a polymer of the diol; an aldehyde; an acid; and an organic solvent to produce a reaction mixture;
   heating the reaction mixture at 70-200° C. to produce a precipitate; and
   washing and drying the precipitate to form the cross-linked polymeric resin;
   wherein the phenol compound is of formula I:

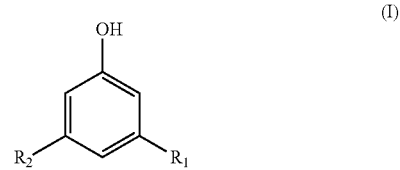

(I)

wherein $R_1$ and $R_2$ are independently H, $OR_3$, an optionally substituted alkyl, an optionally substituted cycloalkyl, or an optionally substituted aryl, and $R_3$ is H, an optionally substituted alkyl, an optionally substituted cycloalkyl, or an optionally substituted aryl;
   and wherein the diol is of formula II:

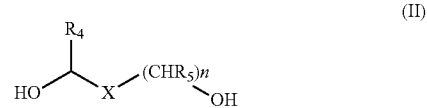

(II)

wherein $R_4$ and $R_5$ are independently H, an optionally substituted alkyl, an optionally substituted cycloalkyl, or an optionally substituted aryl; X is absent, HC=CH, or C≡C; and n=1, 2, 3, 4, 5, or 6.

2. The method of claim 1, wherein the diol, the oligomer of the diol, or the polymer of the diol, is selected from the group consisting of ethylene glycol (EG), diethylene glycol (DEG), triethyleneglycol (TEG), polyethylene glycol (PEG), polypropylene glycol (PPG), and polybutylene glycol (PBG).

3. The method of claim 1, wherein the organic solvent is at least one selected from the group consisting of n-pentane, isopentane, hexane, heptane, and octane.

4. The method of claim 1, wherein the reaction mixture is heated to 85-95° C. to form the precipitate.

5. The method of claim 1, wherein the phenol compound is phenol.

6. The method of claim 1, wherein the aldehyde is formaldehyde.

7. The method of claim 1, wherein a molar ratio of the aldehyde to the phenol compound, the oligomer of the phenol compound, or the polymer of the phenol compound in the reaction mixture is 4:1 to 8:1.

8. The method of claim 1, wherein a molar ratio of the diol, the oligomer of the diol, or the polymer of the diol to the phenol compound, the oligomer of the phenol compound, or the polymer of the phenol compound in the reaction mixture is 1:1 to 5:1.

* * * * *